US012596011B2

(12) United States Patent
Cui et al.

(10) Patent No.: US 12,596,011 B2
(45) Date of Patent: Apr. 7, 2026

(54) METHOD FOR PRESENTING ROADING CONDITIONS, ROAD CONDITION PROCESSING, APPARATUSES, AND COMPUTER DEVICE

(71) Applicant: TENCENT TECHNOLOGY (SHENZHEN) COMPANY LIMITED, Shenzhen (CN)

(72) Inventors: Panpan Cui, Shenzhen (CN); Lei Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 53 days.

(21) Appl. No.: 18/629,578

(22) Filed: Apr. 8, 2024

(65) Prior Publication Data

US 2024/0255301 A1 Aug. 1, 2024

Related U.S. Application Data

(63) Continuation of application No. PCT/CN2023/116641, filed on Sep. 4, 2023.

(30) Foreign Application Priority Data

Sep. 30, 2022 (CN) .......................... 202211211207.4

(51) Int. Cl.
*G01C 21/36* (2006.01)
*G01C 21/00* (2006.01)

(52) U.S. Cl.
CPC ......... *G01C 21/367* (2013.01); *G01C 21/365* (2013.01); *G01C 21/3815* (2020.08)

(58) Field of Classification Search
CPC ............ G01C 21/3694; G01C 21/3676; G01C 21/367; G01C 21/3815; G01C 21/365; G08G 1/0968
See application file for complete search history.

(56) References Cited

U.S. PATENT DOCUMENTS 12,298,142 B1 * 5/2025 Nash ................ G08G 1/096716
2012/0316772 A1 * 12/2012 Han .................... G01C 21/3492
701/414

(Continued)

FOREIGN PATENT DOCUMENTS

CN 108428356 A 8/2018
CN 109425360 A 3/2019

(Continued)

OTHER PUBLICATIONS

Speigle, Autonomous road vehicle navigation, 1995, IEEE, p. 68-71 (Year: 1995).*

(Continued)

*Primary Examiner* — McDieunel Marc
(74) *Attorney, Agent, or Firm* — Anova Law Group, PLLC

(57) ABSTRACT

This application relates to a method for presenting roading conditions. The method includes presenting an initial navigation screen, and displaying a target navigation route on the initial navigation screen; and presenting a target navigation screen in response to a navigation trigger event, and displaying a gradual transitioning road surface corresponding to a current road section in the target navigation route, the gradual transitioning road surface indicating the current road section changing from a first road condition to a second road condition, the gradual transitioning road surface comprising a first road condition texture corresponding to the first road condition, a second road condition texture corresponding to the second road condition, and a gradual transitioning road texture gradually transitioning from the first road condition texture to the second road condition texture, and a road condition transition range corresponding to the gradual transitioning road texture.

20 Claims, 18 Drawing Sheets

(56) References Cited

U.S. PATENT DOCUMENTS

| 2017/0343374 | A1* | 11/2017 | Yi | ........................ | G06V 20/588 |
| 2019/0043370 | A1* | 2/2019 | Mulhall | .................... | G08G 5/26 |
| 2020/0324778 | A1* | 10/2020 | Diamond | ........... | G01C 21/3819 |
| 2024/0051522 | A1* | 2/2024 | Yamaguchi | ............ | G06V 20/58 |

FOREIGN PATENT DOCUMENTS

| CN | 113223134 A | 8/2021 |
| CN | 114964298 A | 8/2022 |
| JP | 2015004607 A | 1/2015 |

OTHER PUBLICATIONS

Guo et al., Robust Road Detection and Tracking in Challenging Scenarios Based on Markov Random Fields With Unsupervised Learning, 2012, IEEE, p. 1338-1354 (Year: 2012).*

Takahashi et al., Occlusion-Free Animation of Driving Routes for Car Navigation Systems, 2006, IEEE, p. 1141-1148 (Year: 2017).*

Ma et al., Generation of Horizontally Curved Driving Lines in HD Maps Using Mobile Laser Scanning Point Clouds, 2019, IEEE, p. 1572-1586 (Year: 2019).*

The World Intellectual Property Organization (WIPO) International Search Report for PCT/CN2023/116641 Jan. 9, 2024 6 Pages (including translation).

* cited by examiner

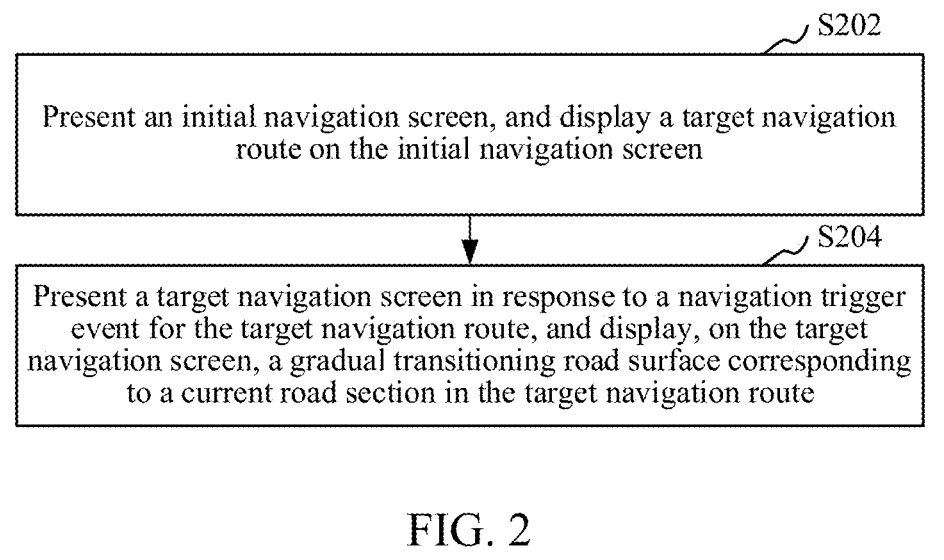

S202

Present an initial navigation screen, and display a target navigation route on the initial navigation screen

S204

Present a target navigation screen in response to a navigation trigger event for the target navigation route, and display, on the target navigation screen, a gradual transitioning road surface corresponding to a current road section in the target navigation route

FIG. 2

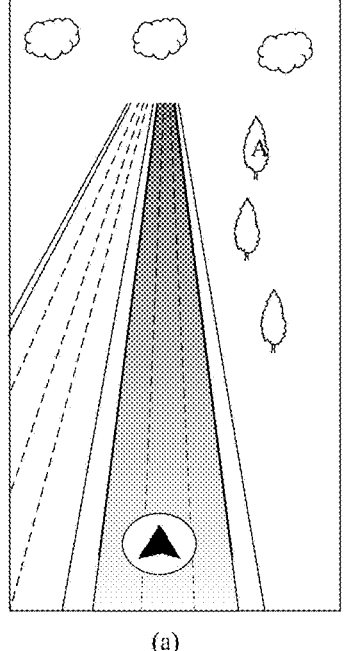
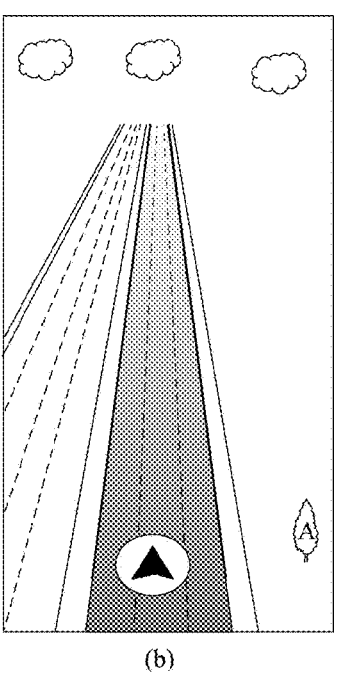
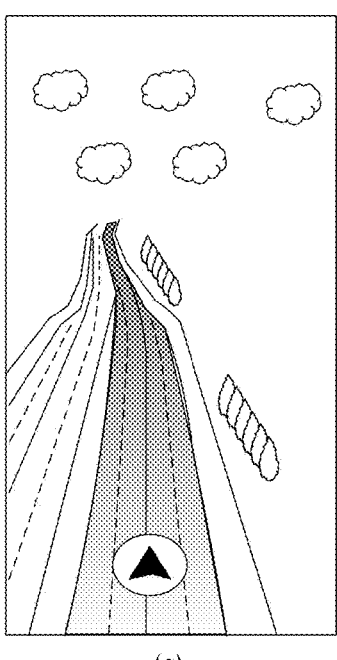
(a)        (b)        (c)
FIG. 6

_S802

Acquire initial road condition textures and road condition coverage ranges respectively corresponding to a first road condition and a second road condition involved in a current road section

_S804

Determine a road condition transition range between the first road condition and the second road condition based on the initial road condition textures and the road condition coverage ranges respectively corresponding to the first road condition and the second road condition

_S806

Adjust the road condition texture over gradual changes from the initial road condition texture corresponding to the first road condition to the initial road condition texture corresponding to the second road condition, to obtain a gradual transitioning road surface texture corresponding to the road condition transition range

_S808

Obtain road section texture data corresponding to the current road section based on the initial road condition textures and corresponding road condition coverage ranges, and the gradual transitioning road surface texture and corresponding road condition transition range, where the road section texture data is used to generate the gradual transitioning road surface corresponding to the current road section, and the gradual transitioning road surface indicating the process of the current road section changing from a first road condition to a second road condition

FIG. 8

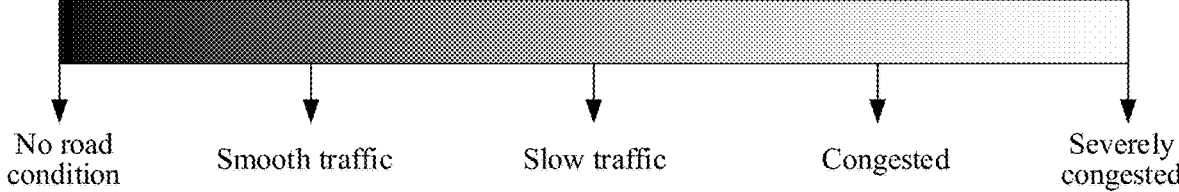

| No road condition | Smooth traffic | Slow traffic | Congested | Severely congested |

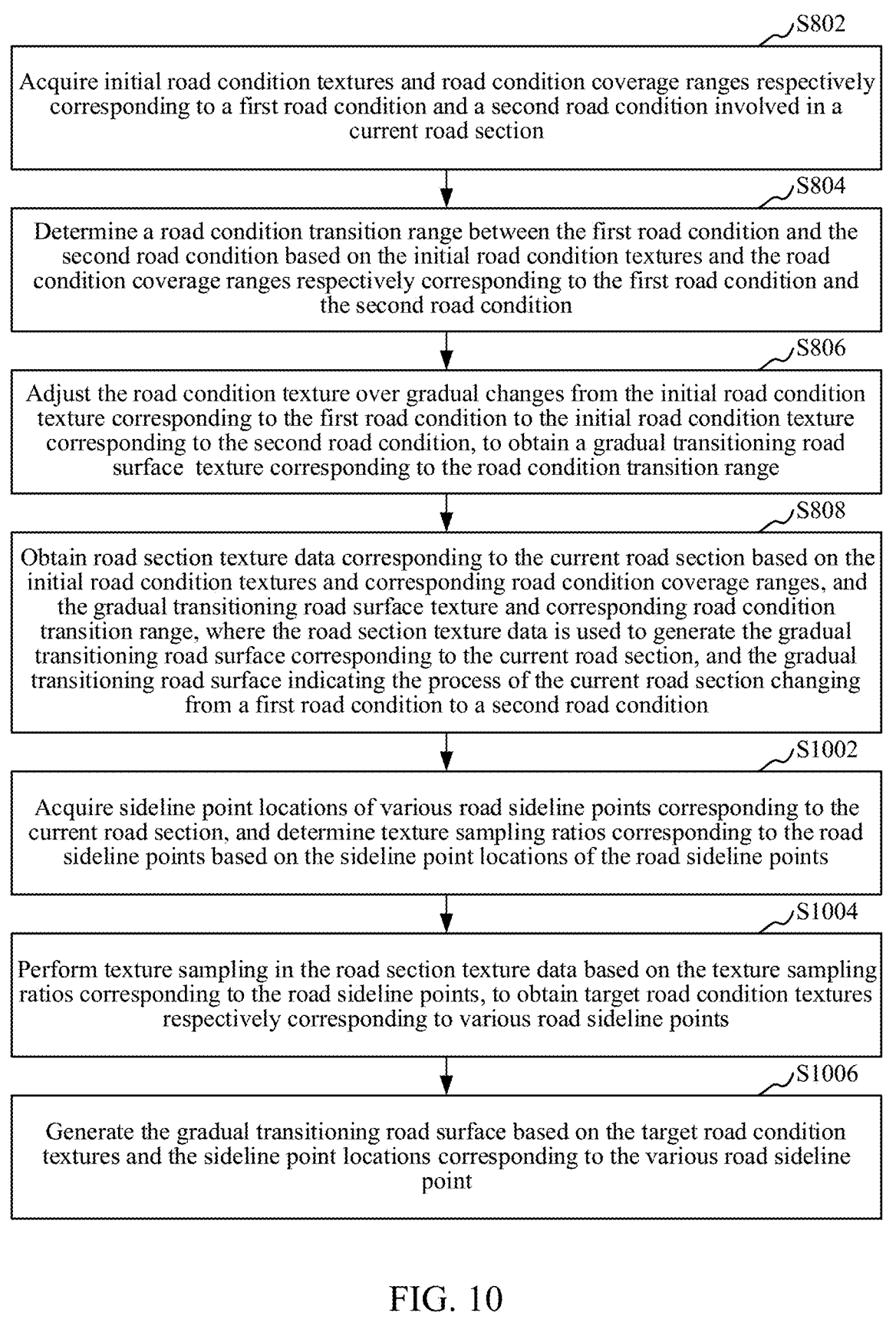

Acquire initial road condition textures and road condition coverage ranges respectively corresponding to a first road condition and a second road condition involved in a current road section

S804

Determine a road condition transition range between the first road condition and the second road condition based on the initial road condition textures and the road condition coverage ranges respectively corresponding to the first road condition and the second road condition

S806

Adjust the road condition texture over gradual changes from the initial road condition texture corresponding to the first road condition to the initial road condition texture corresponding to the second road condition, to obtain a gradual transitioning road surface texture corresponding to the road condition transition range

S808

Obtain road section texture data corresponding to the current road section based on the initial road condition textures and corresponding road condition coverage ranges, and the gradual transitioning road surface texture and corresponding road condition transition range, where the road section texture data is used to generate the gradual transitioning road surface corresponding to the current road section, and the gradual transitioning road surface indicating the process of the current road section changing from a first road condition to a second road condition

S1002

Acquire sideline point locations of various road sideline points corresponding to the current road section, and determine texture sampling ratios corresponding to the road sideline points based on the sideline point locations of the road sideline points

S1004

Perform texture sampling in the road section texture data based on the texture sampling ratios corresponding to the road sideline points, to obtain target road condition textures respectively corresponding to various road sideline points

S1006

Generate the gradual transitioning road surface based on the target road condition textures and the sideline point locations corresponding to the various road sideline point

FIG. 10

Left edge line     Lane centerline     Right edge line

● Edge line point ○ Sampling point

Road condition:
[0,0.5, smooth traffic]
[0.5,1, congested]

Left edge line     Lane centerline     Right edge line

METHOD FOR PRESENTING ROADING CONDITIONS, ROAD CONDITION PROCESSING, APPARATUSES, AND COMPUTER DEVICE

RELATED APPLICATIONS

This application is a continuation application of PCT Application No. PCT/CN2023/116641, filed on Sep. 4, 2023, which in turn claims priority to Chinese Patent Application No. 202211211207.4 entitled "Method for presenting roading conditions, road condition processing method, apparatuses, and computer device" filed with the China National Intellectual Property Administration on Sep. 30, 2022. The two applications are incorporated herein by reference in their entirety.

FIELD OF THE TECHNOLOGY

This application relates to the field of computer technologies, and in particular, to a method for presenting roading conditions, a road condition processing method, apparatuses, a computer device, a storage medium and a computer program product.

BACKGROUND OF THE DISCLOSURE

With the development of computer technologies, navigation technology has been developed. The navigation technology is used to provide navigation and positioning services, and has been used in many areas of daily life, for example, in ride-hailing application software, navigation application software, map application software and others. Navigation technology greatly improves user's travel abilities.

Often, during navigation, the road condition information of a road is usually simply and automatically marked on a navigation screen. The presentation of the road condition information is rough and inaccurate.

SUMMARY

An embodiment of this application provides a method for presenting roading conditions, a road condition processing method, apparatuses, a computer device, a computer readable storage medium and a computer program product.

This application provides a method for presenting roading conditions, implemented by a terminal. The method includes presenting an initial navigation screen, and displaying a target navigation route on the initial navigation screen; and presenting a target navigation screen in response to a navigation trigger event for the target navigation route, and displaying, on the target navigation screen, a gradual transitioning road surface corresponding to a current road section in the target navigation route, the gradual transitioning road surface indicating the current road section changing from a first road condition to a second road condition, the gradual transitioning road surface comprising a first road condition texture corresponding to the first road condition, a second road condition texture corresponding to the second road condition, and a gradual transitioning road texture gradually transitioning from the first road condition texture to the second road condition texture, and a road condition transition range corresponding to the gradual transitioning road texture determined by the road condition textures and road condition coverage ranges corresponding to the first road condition and the second road condition.

A non-transitory computer readable storage medium stores a computer readable instruction thereon. In case that the computer readable instruction is executed by one or multiple processors, steps of the road condition presenting method are implemented.

This application provides a road condition processing method implemented by a computer device. The method acquiring initial road condition textures and road condition coverage ranges respectively corresponding to a first road condition and a second road condition involved in a current road section; determining a road condition transition range between the first road condition and the second road condition based on the initial road condition textures and the road condition coverage ranges respectively corresponding to the first road condition and the second road condition; adjusting a road condition texture over gradual changes from the initial road condition texture corresponding to the first road condition to the initial road condition texture corresponding to the second road condition, to obtain a gradual transitioning road texture corresponding to the road condition transition range; and obtaining road section texture data corresponding to the current road section based on the initial road condition textures and corresponding road condition coverage ranges, and the gradual transitioning road texture and corresponding road condition transition range, the road section texture data corresponding to a gradual transitioning road surface of the current road section, and the gradual transitioning road surface indicating a process of the current road section transitioning from the first road condition to the second road condition.

A computer device includes a memory and one or multiple processors. The memory stores computer instructions. In case that the computer readable instruction is executed by the one or multiple processors, steps of the method for processing and presenting roading conditions are implemented.

Details of one or more embodiments according to the present application are provided in the accompanying drawings and descriptions below. Other features, objectives, and advantages of this application will become apparent from the specification, the drawings, and the claims.

BRIEF DESCRIPTION OF THE DRAWINGS

To describe the technical solutions of the embodiments of this application more clearly, the drawings needed to be used in the description of the embodiments will be described briefly below. Apparently, the drawings in the following description only show some embodiments of this application. Other drawings can be obtained by a person of ordinary skill in the art from these accompanying drawings without creative efforts.

FIG. 2 is a schematic flow chart of a method for presenting roading conditions in an embodiment;

FIG. 6 is a schematic diagram of a target navigation screen in another embodiment;

FIG. 8 is a schematic flow chart of a road condition processing method in an embodiment;

FIG. 9 is a schematic diagram of a candidate road condition texture set in an embodiment;

FIG. 10 is a schematic flow chart of generating a gradual transitioning road surface in an embodiment;

DESCRIPTION OF EMBODIMENTS

To make the objects, technical solutions and advantages of this application clearer, this application will be described below in further detail with reference to accompanying drawings and embodiments. It is to be understood that the specific embodiments described herein are merely used to explain this application, but are not intended to limit this application.

It is to be understood that the trigger operation in this application includes, but is not limited to, a touch operation, a cursor operation, a key operation, a voice operation, and a motion operation, etc. For example, the touch operation can be a touch and press operation, a touch and click operation, or a touch and sliding operation. The cursor operation can be an operation to control the cursor to click, to press or to slide. The key operation can be a virtual key operation or a physical key operation. The voice operation refers to an operation controlled by voice. The motion operation refers to an operation controlled by the user's motion, for example, such as hand motions, head motions and so on.

The embodiments of the present disclosure are applicable to various scenarios, including, but not limited to, cloud technologies, artificial intelligence, intelligent transportation, assisted driving, navigation and the like.

Figure 1:
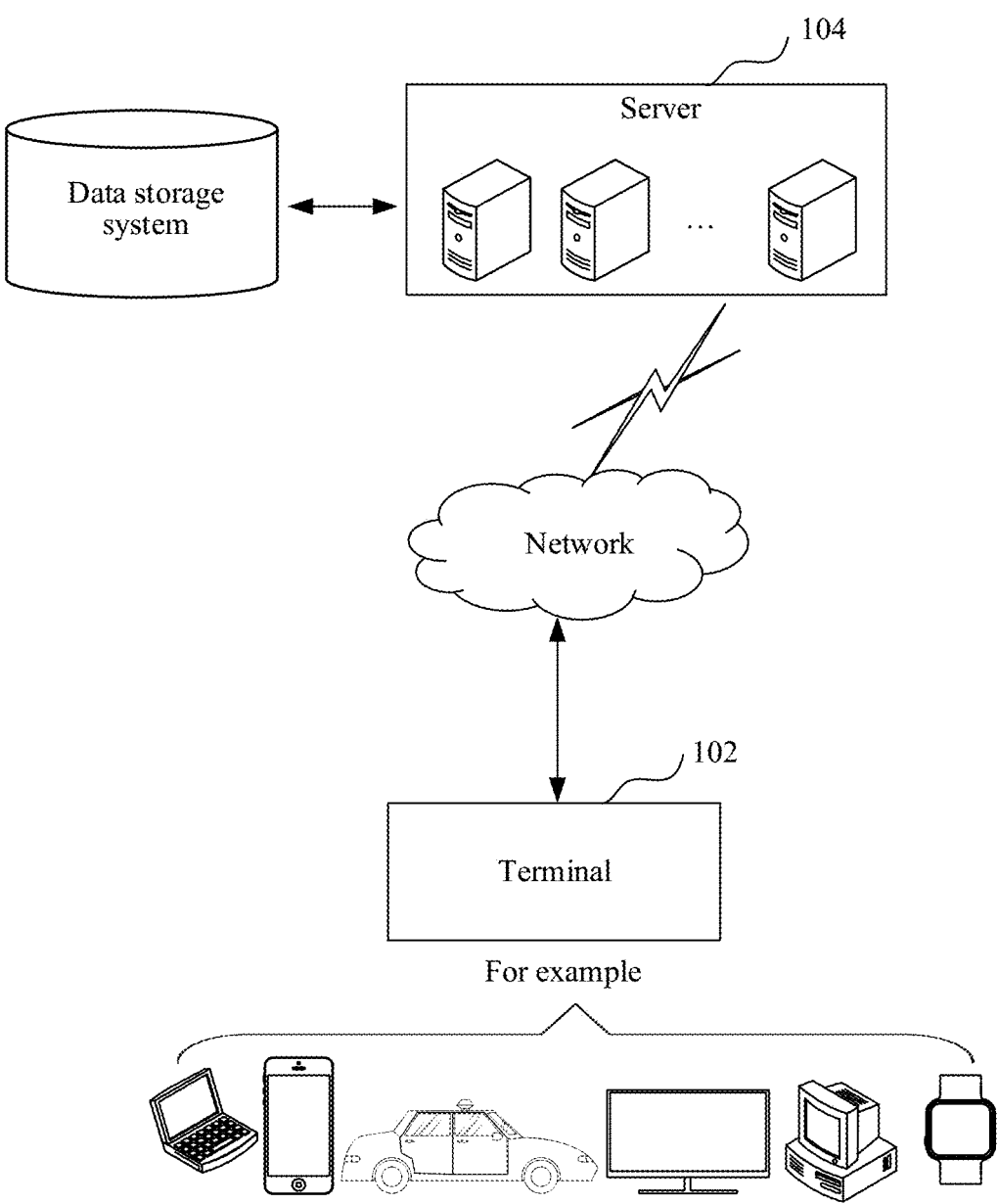
FIG. 1 shows an application environment of a method for presenting roading conditions and a road condition processing method in an embodiment.

The method for presenting roading conditions and the road condition processing method provided in the embodiments of this application are applicable in the application environment as shown in FIG. 1. A terminal 102 communicates with a server 104 through a network. A data storage system can store data that server 104 needs to process. The data storage system can be integrated on server 104, or on the cloud or other servers. The terminal 102 can be, but is not limited to, various desktop computers, notebook computers, smart phones, tablet computers, intelligent voice interaction devices, Internet of Things devices and portable wearable devices. The Internet of Things devices can be smart speakers, smart TVs, smart air conditioners, smart vehicle-mounted devices, aircrafts and the like. The portable wearable devices can be smart watches, smart bracelets, headsets, etc. The server 104 can be implemented by an independent server, a server cluster including multiple servers, or a cloud server.

The terminal 102 presents an initial navigation screen, and displays a target navigation route on the initial navigation screen. The terminal 102 presents a target navigation screen in response to a navigation trigger event for the target navigation route, and displays, on the target navigation screen, a gradual transitioning road surface corresponding to a current road section in the target navigation route. The gradual transitioning road surface is used to indicate a process of the current road section changing from a first road condition to a second road condition. The gradual transitioning road surface includes a first road condition texture corresponding to the first road condition, a second road condition texture corresponding to the second road condition, and a gradual transitioning road texture gradually transitioning from the first road condition texture to the second road condition texture. A road condition transition range corresponding to the gradual transitioning road texture is determined by the road condition textures and road condition coverage ranges corresponding to the first road condition and the second road condition. As such, in case that the navigation for the target navigation route is triggered, road condition information of the current road section is presented by displaying, on the navigation screen, the gradual transitioning road surface corresponding to the current road section in the navigation route. The gradual transitioning road surface can reflect the process of the current road section gradually transitioning from the first road condition to the second road condition, so that the presentation of the road condition information is more in line with the real road scenarios, thereby improving the accuracy of road condition presentation. The first road condition texture and the second road condition texture are used to distinguish different road conditions. The gradual transitioning road texture is used to reflect the changing process between different road conditions. The road condition coverage ranges, and the road condition transition range can determine the coverage ranges of the road condition textures of different road conditions and the gradual transitioning road texture. Therefore, the gradual transitioning road surface generated based on these data can realize a smooth gradual change effect between different road conditions. The generated gradual transitioning road surface can reflect the process of the current road section gradually transitioning from the first road condition to the second road condition, so that the presentation of the road condition information is more in line with the real road scenarios, thereby improving the accuracy of road condition presentation and improving the accuracy of navigation.

The server acquires the initial road condition textures and the road condition coverage ranges respectively corresponding to the first road condition and the second road condition involved in the current road section; and determines the road condition transition range between the first road condition and the second road condition based on the initial road condition textures and the road condition coverage ranges respectively corresponding to the first road condition and the second road condition. The server adjusts the road condition texture over gradual changes from the initial road condition texture corresponding to the first road condition to the initial road condition texture corresponding to the second road condition, to obtain the gradual transitioning road texture corresponding to the road condition transition range. The server obtains road section texture data corresponding to the current road section based on the initial road condition textures and corresponding road condition coverage ranges, and the gradual transitioning road texture and corresponding road condition transition range. The road section texture data is used to generate the gradual transitioning road surface corresponding to the current road section. The gradual transitioning road surface is used to indicate the process of the current road section changing from a first road condition to a second road condition. The server can transmit the road section texture data to the terminal, and the terminal generates the gradual transitioning road surface based on the road section texture data. Therefore, the road section texture data obtained based on the initial road condition textures, the gradual transitioning road texture, the road condition coverage ranges and the road condition transition range can be used to generate the gradual transitioning road surface. The initial road condition textures are used to distinguish different road conditions. The gradual transitioning road texture is used to reflect the changing process between different road conditions. The road condition coverage ranges, and the road condition transition range can determine the coverage ranges of the initial road condition textures and the gradual transitioning road texture. Therefore, the gradual transitioning road surface generated can realize a smooth gradual change effect between different road conditions. The generated gradual transitioning road surface can reflect the process of the current road section gradually transitioning from the first road condition to the second road condition, so that the presentation of the road condition information is more in line with the real road scenarios, thereby improving the accuracy of road condition presentation and improving the accuracy of navigation.

It is to be understood that both the terminal and the server can be used independently to implement the road condition processing method provided in the embodiment of this application. The terminal and the server can also be used cooperatively to implement the method for presenting roading conditions and the road condition processing method provided in the embodiments of this application.

In an embodiment, as shown in FIG. 2, a method for presenting roading conditions is provided. For example, this method is applied to a terminal. Referring to FIG. 2, the method for presenting roading conditions includes the following steps:

Step S202: Present an initial navigation screen, and display a target navigation route on the initial navigation screen.

The navigation screen refers to a screen presented during navigation. The initial navigation screen is a navigation screen used to present the target navigation route.

The navigation route refers to a moving route from a starting location to a destination. The starting location refers to a location of departure upon navigation. The starting location can be a currently positioned location of the terminal, or a location input or selected by a user through the operation of the terminal. For example, it can be a location corresponding to a name of a starting location inputted by the user in an input field of starting location information in a map application; or a location determined by point pickup on a starting location determination interface of the map application; and the like. The destination refers to the location of arrival upon navigation. The destination can be an intended destination input or selected by the user through the operation of the terminal. For example, it can be a location corresponding to a name of a destination inputted by the user in an input field of destination information in the map application; or a location determined by point pickup on a destination determination interface of the map application; and the like. The destination can also be a location recommended to the user through the terminal. For example, it can be a place corresponding to recommended delicious food shops, shopping malls, cinemas and other places.

The target navigation route refers to a currently determined navigation route. The target navigation route may be a route selected by the user through a selection operation. For example, after the starting location and the destination are determined, the terminal presents, in response to an activation operation of a route planning function, multiple candidate navigation routes from the same starting location to the same destination, and the terminal takes the candidate navigation route selected by the user on the presentation interface as the target navigation route. The target navigation route can also be a route actively recommended to the user. For example, the terminal or a server actively takes a navigation route with the shortest navigation distance as the target navigation route; the terminal or the server actively takes a navigation route with the shortest estimated navigation time as the target navigation route, and the like.

Particularly, in case that the starting location and the destination are determined, the terminal can display an initial navigation screen with the target navigation route from the starting location to the destination, so that the user can get to know the moving route from the starting location to the destination.

In an embodiment, the terminal displays the input destination in response to an input operation of the destination. The terminal presents, in response to an activation operation of a route planning function, at least one candidate navigation route from the positioned location of the terminal to the destination. The terminal presents, in response to a selection operation of a target navigation route in the candidate navigation routes, an initial navigation screen displaying the target navigation route.

Figure 3:
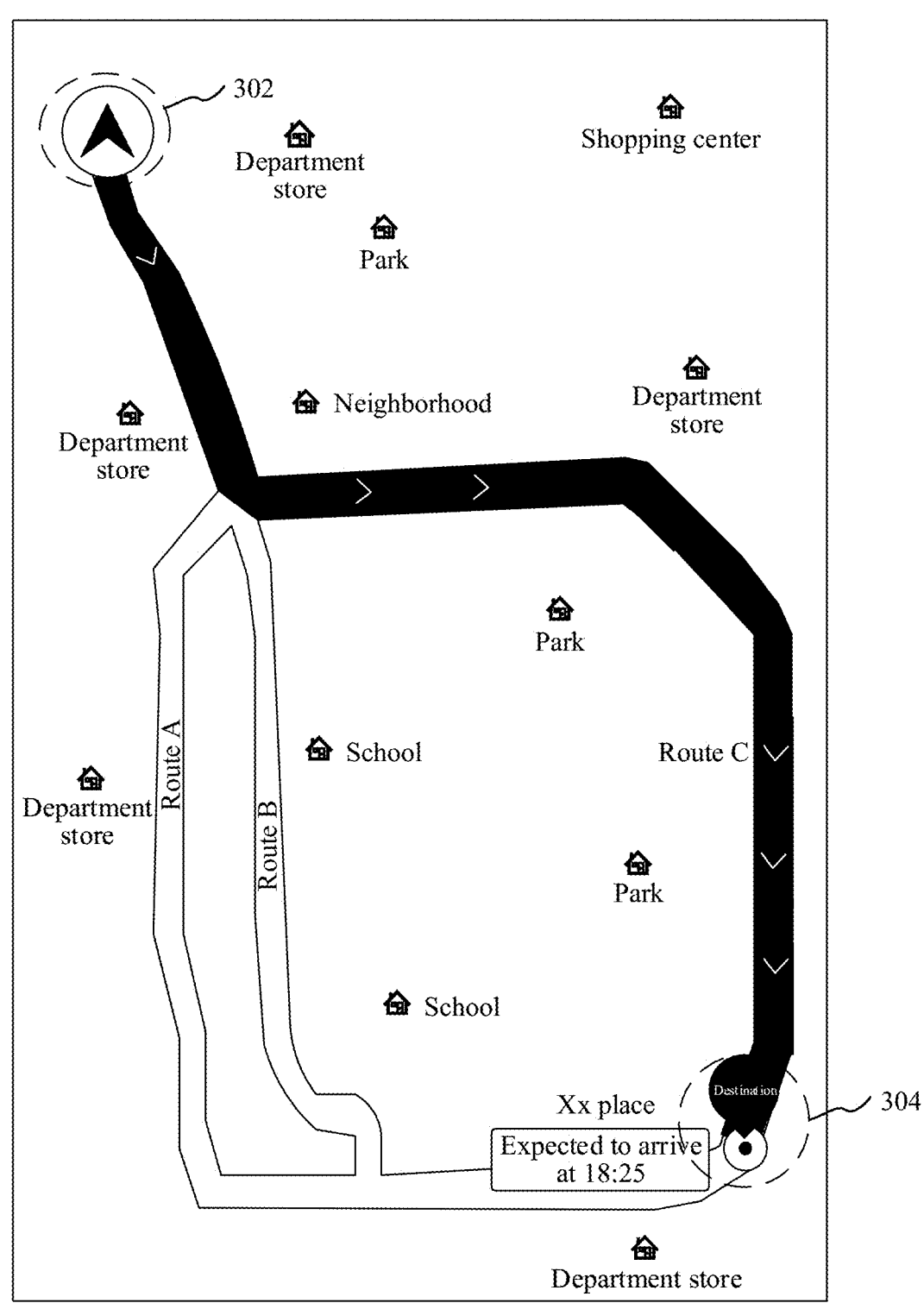
FIG. 3 is a schematic diagram of an initial navigation screen in an embodiment.

In an embodiment, after the target navigation route is determined, the candidate navigation routes and the target navigation route can be presented in different navigation interfaces, or in the same navigation interface. In case that they are presented in the same navigation interface, the target navigation route can be displayed discriminatively from other candidate navigation routes on the initial navigation screen. Specifically, the target navigation route can be highlighted, and other candidate navigation routes are weakened on the initial navigation screen. For example, the target navigation route is presented in a dark color, and other candidate navigation routes are presented in a light color. Further, in case that the user changes the target navigation route, the terminal can change the target navigation route in response to a trigger operation for other candidate navigation routes. The initial navigation screen can be as shown in FIG. 3. In FIG. 3, 302 indicates the starting location, 304 indicates the destination, the route C filled in black is the target navigation route, and the routes A and B are other candidate navigation routes.

Step S204: Present a target navigation screen in response to a navigation trigger event for the target navigation route, and display, on the target navigation screen, a gradual transitioning road surface corresponding to a current road section in the target navigation route.

The navigation trigger event refers to an event that activates the navigation function. The navigation trigger event for the target navigation route refers to an event that activates the navigation according to the target navigation route. The current road section is a road section currently to be entered in the target navigation route. The current road section is a road section determined on the target navigation route based on the currently positioned location of the terminal. In case the starting location of the target navigation route is determined based on the currently positioned location of the terminal, the current road section can be considered as the starting road section in the target navigation route.

The navigation trigger event for the target navigation route can be triggered by a trigger operation acting on the initial navigation screen. For example, the navigation trigger event for the target navigation route is triggered by a trigger operation acting on the target navigation route; the navigation trigger event for the target navigation route is triggered by a trigger operation acting on a preset area in the initial navigation screen; and the navigation trigger event for the target navigation route is triggered by a trigger operation acting on a preset control in the initial navigation screen.

The target navigation screen presented in response to the navigation trigger event is used to present a gradual transitioning road surface corresponding to the current road section in the target navigation route. The road conditions involved in the current road section include a first road condition and a second road condition. The first condition and the second road condition are two adjacent and different road conditions. The road condition is used to characterize the road congestion.

In order to distinguish different road conditions upon display, the road conditions can be presented with road condition textures. Different road conditions correspond to different road condition textures. The road condition texture refers to texture information attached to the road, which is used to visually reflect the road congestion. The road condition texture can be a texture presented in at least one of color, line, and pattern, etc. For example, different road condition textures can have different colors; different road condition textures can have lines with different densities; and the like. In an embodiment, the road condition texture is a texture screen, which is used to add visual features to a road area on a screen in computer graphics.

The gradual transitioning road surface refers to a road surface that can present a gradual change effect in a screen and reflect the process of road condition changes on the road. The gradual transitioning road surface corresponding to the current road section is used to indicate the process of the current road section transitioning from the first road condition to the second road condition. The gradual transitioning road surface vividly reflects the process of the current road section transitioning from the first road condition to the second road condition by a gradually changing transitional road condition texture, to bring an experience of road condition change that is more in line with the real road scenario.

The gradual transitioning road surface corresponding to the current road section includes a first road condition texture corresponding to the first road condition, a second road condition texture corresponding to the second road condition, and a gradual transitioning road texture gradually transitioning from the first road condition texture to the second road condition texture. The first road condition texture corresponding to the first road condition is an initial road condition texture corresponding to the first road condition, and the second road condition texture corresponding to the second road condition is an initial road condition texture corresponding to the second road condition. The initial road condition texture refers to an initialized and fixed road condition texture, which is used to visually distinguish different road conditions upon display. Initial road condition textures corresponding to various road conditions can be preset to distinguish various road conditions. For example, different road conditions can be represented by different colors, and various road conditions respectively have corresponding texture colors. The gradual transitioning road texture is a road condition texture set including a variety of road condition textures changing regularly, which is used to visually present a gradually changing transitional effect between road conditions upon display. For example, in case that different colors are used to represent different road conditions, the initial road condition texture is a preset texture color, and the gradual transitioning road texture includes at least one transitional color between different preset texture colors. The road condition texture gradually transitioning from the first road condition texture to the second road condition texture includes a road condition texture set including multiple road condition textures that regularly change from the first road condition texture to the second road condition texture. For example, the first road condition texture is green, the second road condition texture is red, and a gradual transitioning road texture corresponding to a road condition transition range between the first road condition and the second road condition include green, yellow-green, yellow, yellow-orange, orange, orange-red, and red arranged in order. The green, yellow-green, yellow, yellow-orange, orange, orange-red, and red arranged in order can present a color transition process gradually changing from green to red.

The road condition transition range refers to a road section range where the road condition texture transition is needed, and the road condition transition range is used to indicate the coverage range of the gradual transitioning road texture on the road section. The road condition transition range between the first road condition and the second road condition is a transition range determined by the road condition textures and road condition coverage ranges corresponding to the first road condition and the second road condition, that is, a transition range determined by the initial road condition textures and the road condition coverage ranges corresponding to the first road condition and the second road condition. The terminal or server can determine the road transition range based on the differences in the initial road condition texture and the road condition coverage range between the first road condition and the second road condition. By referring to the initial road condition textures of different road conditions in case of determining the road condition transition range, the road condition transition range can be made to change with varying road conditions, thus ensuring the flexibility in the display of road condition transition. For example, in case that there is a large difference between the initial road condition textures corresponding to different road conditions, a large road condition transition range is used in the display of road condition transition. In case that a large difference is shown in the textures between adjacent road conditions, a large space is used to show the process of gradually changing from one texture to another, such that the texture transition becomes more natural and the clarity of the display of road condition transition is improved. By referring to the road condition coverage ranges of different road conditions in case of determining the road condition transition range, the road condition transition range is ensured not to exceed the road section coverage range of a single road condition, thus ensuring the reliability of the road condition transition display.

In an embodiment, the gradual transitioning road surface corresponding to the current road section is generated based on the road section texture data corresponding to the current road section. The road section texture data is obtained from the road condition coverage ranges and the initial road condition textures respectively corresponding to the first road condition and the second road condition, the road condition transition range between the first road condition and the second road condition and corresponding gradual transitioning road texture. The road section texture data can be obtained by arranging and combining, based on the road condition coverage ranges respectively corresponding to the first road condition and the second road condition and the road condition transition range between the first road condition and the second road condition, the initial road condition textures respectively corresponding to the first road condition and the second road condition and the gradual transitioning road texture corresponding to the road condition transition range. That is, the road section texture data is obtained by combining the initial road condition textures and the gradual transitioning road texture arranged in order. The road condition coverage range refers to a road section range corresponding to a single road condition, which is used to indicate the initial coverage range of the initial road condition texture on the road section.

It is to be understood that the specific generation process of the gradual transitioning road surface can be made reference to the following descriptions of various embodiments of the road condition processing method.

Particularly, in case that the terminal detects a corresponding trigger operation acting on the initial navigation interface, it triggers a navigation trigger event for the target navigation route, presents a target navigation screen in response to the navigation trigger event, and displays, on the target navigation screen, a gradual transitioning road surface corresponding to a current road section in the target navigation route.

Figure 4:
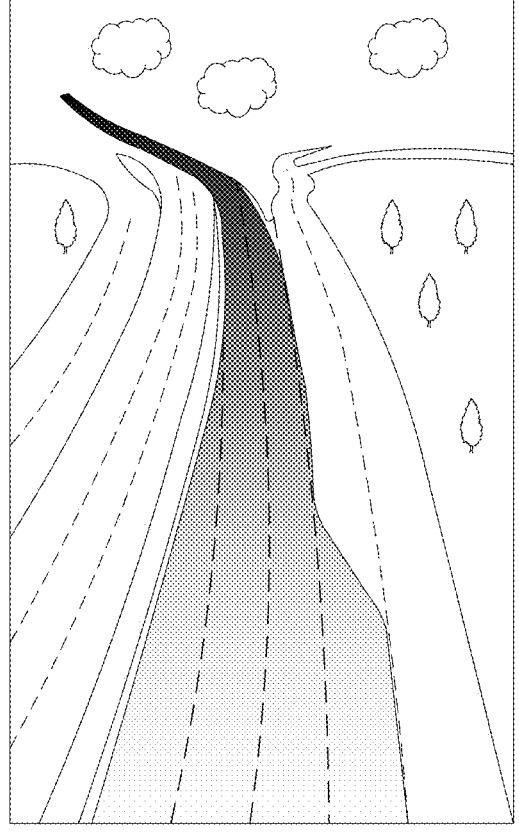
FIG. 4 is a schematic diagram of a target navigation screen in an embodiment.

In an embodiment, the target navigation screen is a three-dimensional stereoscopic screen, and the target navigation screen is a local three-dimensional electronic map obtained by projecting the road scenario where the current road section is located in a three-dimensional electronic map according to a certain perspective of navigation. The target navigation screen is as shown in FIG. 4. In the target navigation screen, the road condition texture of the road plane corresponding to the current road section is gradually changed and transitional. In a three-dimensional map generated by three-dimensional modeling, a three-dimensional immersive navigation screen can be obtained by shooting with a virtual camera that matches the perspective of navigation. The immersive navigation screen can provide the user with an immersive navigation experience, such that the user has a navigation screen that is more in line with the real road scenario.

In an embodiment, the initial navigation screen and the target navigation screen can be presented in the same interface. For example, the initial navigation screen is presented in the left half of the navigation interface, and the target navigation screen is presented in the right half of the navigation interface. In case that the initial navigation screen and the target navigation screen are presented in the same interface, in response to a trigger operation on any navigation screen, the triggered navigation screen is presented alone. For example, in response to the user's click operation on the target navigation screen, the terminal enlarges and presents the target navigation screen, so that the target navigation screen is presented alone in the navigation interface. Definitely, the initial navigation screen and the target navigation screen can also be presented in different interfaces. For example, after the target navigation route is determined, the initial navigation screen is presented, and after a trigger operation for the current road section in the target navigation route is detected, the initial navigation screen jumps to the target navigation screen.

In the method for presenting roading conditions, an initial navigation screen is presented, a target navigation route is displayed on the initial navigation screen, a target navigation screen is presented in response to a navigation trigger event for the target navigation route, and a gradual transitioning road surface corresponding to a current road section in the target navigation route is displayed on the target navigation screen. The gradual transitioning road surface is used to indicate a process of the current road section changing from a first road condition to a second road condition. The gradual transitioning road surface includes a first road condition texture corresponding to the first road condition, a second road condition texture corresponding to the second road condition, and a gradual transitioning road texture gradually transitioning from the first road condition texture to the second road condition texture. A road condition transition range corresponding to the gradual transitioning road texture is determined by the road condition textures and road condition coverage ranges corresponding to the first road condition and the second road condition. Therefore, in case that the navigation for the target navigation route is triggered, road condition information of the current road section is presented by displaying, on the navigation screen, the gradual transitioning road surface corresponding to the current road section. The gradual transitioning road surface can reflect the process of the current road section gradually transitioning from the first road condition to the second road condition, so that the presentation of the road condition information is more in line with the real road scenarios, thereby improving the accuracy of road condition presentation. The first road condition texture and the second road condition texture are used to distinguish different road conditions. The gradual transitioning road texture is used to reflect the changing process between different road conditions. The road condition coverage ranges, and the road condition transition range can determine the coverage ranges of the road condition textures of different road conditions and the gradual transitioning road texture. Therefore, the gradual transitioning road surface generated based on these data can realize a smooth gradual change effect between different road conditions. The generated gradual transitioning road surface can reflect the process of the current road section gradually transitioning from the first road condition to the second road condition, so that the presentation of the road condition information is more in line with the real road scenarios, thereby improving the accuracy of road condition presentation and improving the accuracy of navigation.

In an embodiment, the target navigation route is used to direct a navigation object for travel navigation following the target navigation route, and the initial navigation screen includes a navigation activation control responding to the navigation trigger event. Step S204 includes:

presenting a target navigation screen in response to a navigation trigger operation for the navigation activation control; and displaying, on the target navigation screen, a gradual transitioning road surface corresponding to a current road section in the target navigation route that the navigation object will enter, where the current road section is a road section determined on the target navigation route based on a currently positioned location of the navigation object. The target navigation screen is a three-dimensional navigation screen determined according to a current perspective of navigation corresponding to the navigation object at the positioned location of the navigation object.

The navigation object is a navigated object, for example, a user that enables the navigation function, and a vehicle driven by the user, etc. The terminal determines the positioned location of its own as the positioned location of the navigation object. For example, in case that the user navigates through a mobile phone while driving, the positioned location of the mobile phone is the positioned location of the navigation object. For example, in case that the user navigates through a vehicle-mounted navigation device, the positioned location of the vehicle is the positioned location of the navigation object.

The navigation activation control is a control configured to trigger the activation of a route navigation function. The route navigation function refers to the function of real-time route guidance during navigation. By triggering the navigation activation control, a navigation function of guiding the navigation object from the currently positioned location to a navigation destination in real time following the target navigation route can be activated. After the navigation activation control is triggered, a gradual transitioning road surface corresponding to the current road section in the target navigation route that the navigation object will enter can be presented. The current road section is a road section determined on the target navigation route based on the currently positioned location of the navigation object. The currently positioned location of the navigation object can be taken as a starting point of a road section, an ending point of the road section can be determined on the target navigation route, and a road section from the starting point to the ending point of the road section on the target navigation route is taken as the current road section. For example, the ending point of a road section can be obtained by advancing a preset distance from the starting point of the road section along the target navigation route. Alternatively, the ending point of the road section on the target navigation route can be determined according to the current perspective of navigation corresponding to the navigation object at the positioned location of the navigation object. A current visual field of navigation is determined according to the current perspective of navigation at the positioned location of the navigation object, and a farthest location on the target navigation route that comes into the visual field of navigation is taken as the ending point of the road section. That is, the ending point of the road section is the farthest location that the user can observe on the target navigation screen during navigation, and the current road section is a section of road on the target navigation route that the user can observe to the largest extent at present on the target navigation screen.

The perspective of navigation is a reference location projecting an electronic map that is used to determine the visual field of navigation during navigation and determine the road scenario range that the user can observe during navigation. The current perspective of navigation corresponding to the navigation object refers to a perspective of navigation currently used by the navigation object.

The three-dimensional navigation screen is a local three-dimensional electronic map obtained by projecting on the three-dimensional electronic map according to the perspective of navigation. The three-dimensional navigation screen is a three-dimensional screen that provides the user with an immersive experience during navigation.

Particularly, the navigation trigger event for the target navigation route can be triggered by a selection operation acting on the navigation activation control. After the target navigation route is determined, the user can trigger and activate the route navigation function by triggering the navigation activation control, and an three-dimensional navigation screen corresponding to the current road section that the navigation object will enter on the target navigation route is triggered to be presented by triggering and activating the route navigation function, so as to guide the navigation object to travel correctly. The gradual transitioning road surface of the starting road section that the navigation object is ready to enter is presented synchronously in the three-dimensional navigation screen, so that the user can get to know the road scenario and detailed road condition information that he/she will experience in real time. In response to the user's trigger operation on the navigation activation control on the initial navigation screen, the terminal displays an immersive navigation screen obtained by projecting the three-dimensional electronic map at the positioned location of the navigation object according to the current perspective of navigation corresponding to the navigation object.

Figure 5:
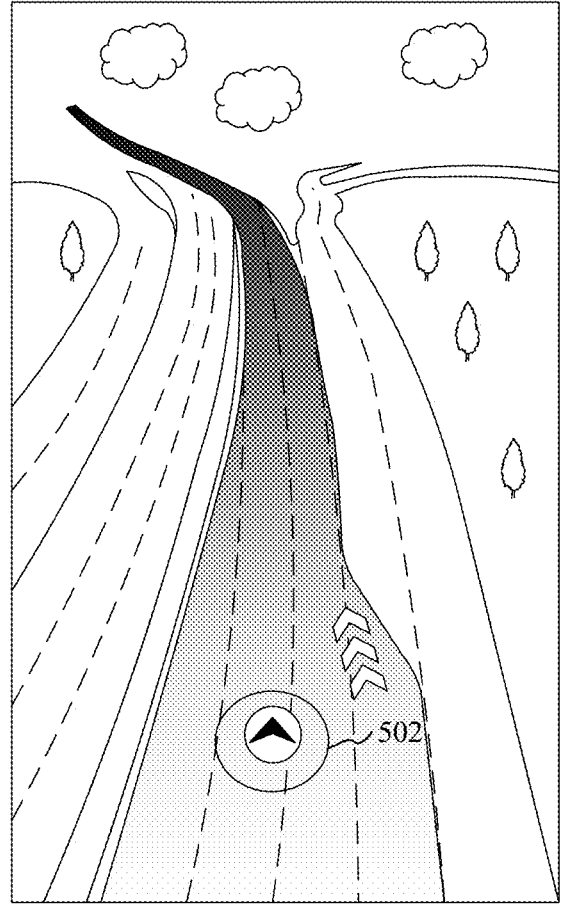
FIG. 5 is a schematic diagram of a target navigation screen in another embodiment.

The target navigation screen is as shown in FIG. 5. The target navigation screen can also display an identifier 502 of the navigation object, the location of which in the electronic map can reflect the geographical location of the navigation object. Further, the target navigation screen can also display navigation route guidance information, which is text information or graphic information. For example, the identifier corresponding to the navigation object includes a guidance arrow indicating the traveling direction, as shown by 502 in FIG. 5, which is a guidance arrow starting from the identifier of the navigation object and used to indicate the traveling direction.

In the above embodiment, the displaying, on the target navigation screen, a gradual transitioning road surface corresponding to a current road section that the navigation object will enter in response to the trigger operation on the navigation activation control can be presenting a gradual transitioning road surface initiating from the starting road section of the target navigation route to the user, to assist in the travel navigation of the navigation object, and bring convenience to the user to view the road condition change process on the navigation route during driving. The target navigation screen is a three-dimensional navigation screen determined according to a current perspective of navigation corresponding to the navigation object at the positioned location of the navigation object, which can provide the user with an immersive navigation experience, is more in line with the real visual scenario, and improves the navigation accuracy.

In an embodiment, the method for presenting roading conditions further includes:

sequentially displaying, on the target navigation screen that changes synchronously with the movement of the navigation object, a gradual transitioning road surface respectively corresponding to each road section that the navigation object will enter sequentially on the target navigation route, in case that the navigation object moves following the target navigation route.

Particularly, in response to the user's trigger operation on the navigation activation control on the initial navigation screen, the terminal displays a target navigation screen, and displays, on the target navigation screen, a gradual transitioning road surface corresponding to the starting road section that the navigation object will enter. In case that the navigation object moves following the target navigation route, the target navigation screen determined according to the current perspective of navigation corresponding to the navigation object can be updated in real time with the movement of the navigation object, so as to achieve real-time route guidance of the navigation object. The gradual transitioning road surface respectively corresponding to each road section that the navigation object will enter sequentially on the target navigation route can be sequentially displayed on the target navigation screen that changes synchronously with the movement of the navigation object, so that the user can get to know the road scenario and detailed road condition information of a next road section to be passed in real time during the traveling process of the navigation object. FIG. 6 shows three pictures (a), (b) and (c) appearing in the order of (a)-(b)-(c) in the target navigation screen that changes with the movement of the same navigation object in real time.

For example, the road conditions involved in the target navigation route include a first road condition, a second road condition, a third road condition and a fourth road condition that are adjacent in sequence. the first road condition and the second road condition correspond to road section A, the second road condition and the third road condition correspond to road section B, and the third road condition and the fourth road condition correspond to road section C. After the user clicks the navigation activation control, a target navigation screen is displayed, and as the user drives the vehicle to travel, a target navigation screen that the road scenario moves synchronously is presented. According to the order of appearance of each road section in the visual field of navigation corresponding to the navigation screen, gradual transitioning road surfaces respectively corresponding to road section A, road section B and road condition C are sequentially presented.

In case that the navigation object moves following the target navigation route, the road condition surface can be always displayed on the target navigation screen changing synchronously with the movement of the navigation object. In case that the target navigation route involves multiple road conditions, each road condition will be presented sequentially as the navigation object moves along the target navigation route. In case that the road section on the target navigation route displayed on the current navigation screen has different road conditions, the road condition surface displayed is a gradual transitioning road surface. In case that a road section on the target navigation route displayed on the current navigation screen has only one road condition, the road condition surface displayed includes the initial road condition texture corresponding to the single road condition.

In the above embodiment, in case that the navigation object moves following the target navigation route, gradual transitioning road surfaces respectively corresponding to various road sections that the navigation object will enter will be displayed sequentially in real time as the navigation object moves, so as to achieve real-time route guidance of the navigation object and presentation of precise road condition information, thus improving the navigation accuracy.

In an embodiment, the method for presenting roading conditions further includes displaying a reference navigation screen in response to a selection operation on a target road section among various road sections of the target navigation route, and displaying a gradual transitioning road surface corresponding to the target road section on a reference navigation screen. The reference navigation screen is a three-dimensional navigation screen determined at a road section positioned location where the target road section resides according to a preset perspective of navigation.

The reference navigation screen is a navigation screen used to present a gradual transitioning road surface corresponding to the target road section. The target road section is any road section selected from various road sections of the target navigation route. It is to be understood that the target navigation route can be divided into multiple road sections according to various road conditions involved in the target navigation route, one road section involves at least two adjacent different road conditions, and the selected road section from the divided road sections is taken as the target road section.

The preset perspective of navigation refers to a preset and fixed perspective of navigation. The preset perspective of navigation can be a default perspective of navigation of the system, or a perspective of navigation input or selected by the user through an operation of the terminal. The road section positioned location is used to locate the geographical location of the road section.

Particularly, in addition to presenting a gradual transitioning road surface during route navigation following the target navigation route, the presentation of the gradual transitioning road surface can be triggered by a selection operation acting on any road section in the target navigation route. The user can perform road section selection in each road section involved in the target navigation route to trigger the presentation of a three-dimensional navigation screen corresponding to the selected road section, and the gradual transitioning road surface corresponding to the selected road section is presented in the three-dimensional navigation screen, so that the user can get to know the road scenario and detailed road condition information of any road section involved in the target navigation route in advance. In response to the user's selection operation of the target road section in each road section involved in the target navigation route, the terminal displays an immersive navigation screen obtained by projecting the three-dimensional electronic map at the road section positioned location where the target road section resides according to the preset perspective of navigation in the navigation interface.

In the above embodiment, in response to the selection operation of the current road section in each road section of the target navigation route, a gradual transitioning road surface corresponding to the current road section is displayed on the target navigation screen, so that the gradual transitioning road surface corresponding to the selected current road section can be displayed to the user, and the user can conveniently make an choice to view the road condition changing process of any road section. The target navigation screen is a three-dimensional navigation screen determined at a road section positioned location where the current road section resides according to a preset perspective of navigation, which can provide the user with an immersive navigation experience, is more in line with the real visual scenario, and improves the navigation accuracy.

In an embodiment, the method for presenting roading conditions further includes displaying a global road condition surface corresponding to the target navigation route on the initial navigation screen. The global road condition surface is used to indicate various road conditions involved in the target navigation route, and the global road condition surface includes initial road condition textures respectively corresponding to various road conditions.

The global road condition surface refers to a geometric surface that can present all the road conditions involved in the navigation route. The global road condition surface corresponding to the target navigation route is used to indicate various road conditions involved in the target navigation route. The global road condition surface includes the initial road condition textures respectively corresponding to various road conditions involved in the target navigation route, and the global road condition surface vividly reflects various road conditions involved in the navigation route by means of the initial road condition textures, and reflects the road condition information of the navigation route as a whole.

Particularly, in case that the target navigation route is displayed on the initial navigation screen, the global road condition surface corresponding to the target navigation route can be displayed, so that the user can get to know the overall road condition information of the target navigation route.

Figure 7:
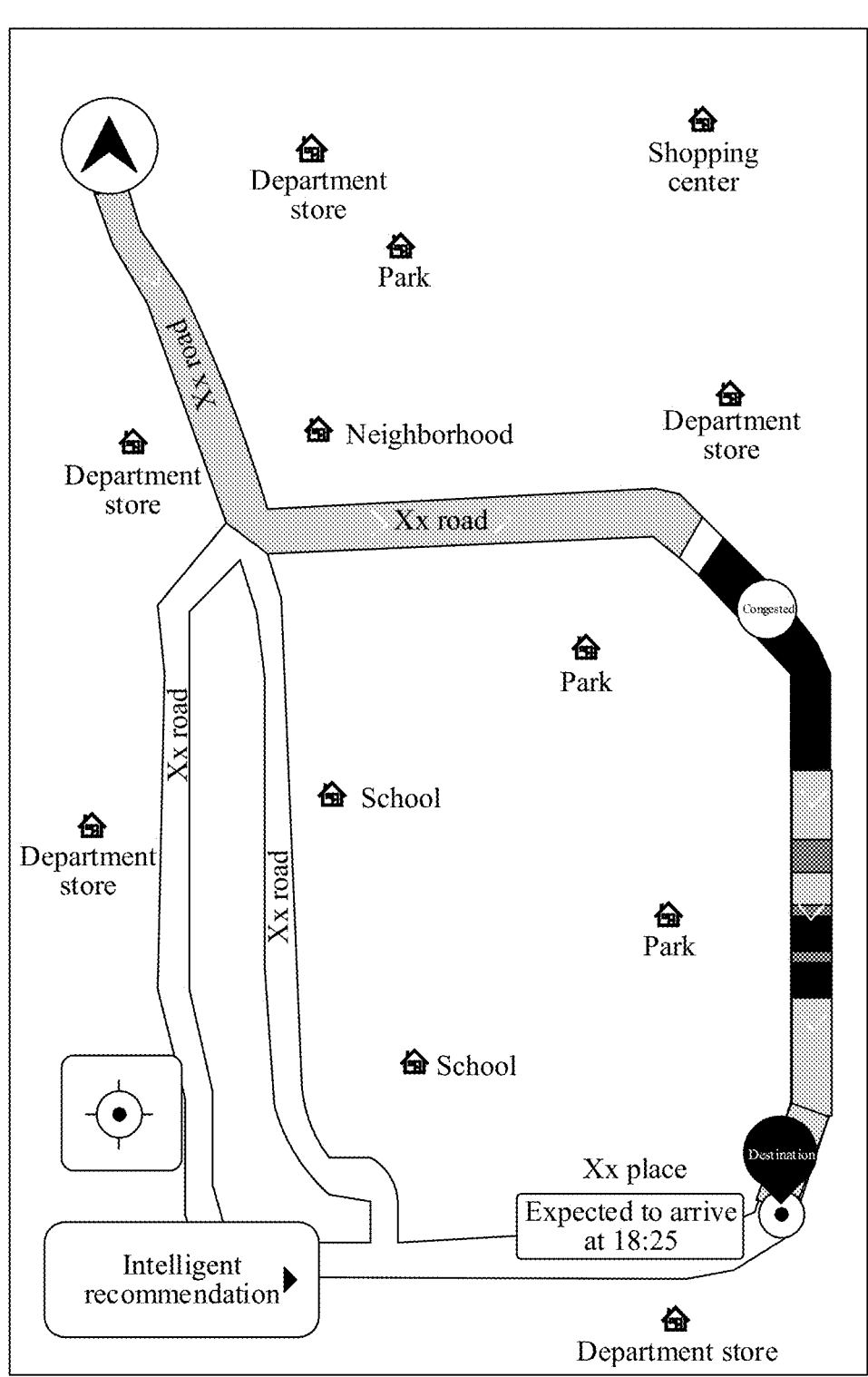
FIG. 7 is a schematic diagram of an initial navigation screen in another embodiment.

In an embodiment, to improve the display efficiency, the road condition textures involved in the global road condition surface may only include the initial road condition textures respectively corresponding to various road conditions. Referring to FIG. 7, in the global road condition surface, the initial road condition textures of adjacent road conditions are directly joined without texture transition. In FIG. 7, different colors represent different road conditions. Definitely, to improve the display accuracy, the global road condition surface can also be a road condition surface with gradually changing transitional textures between various groups of adjacent road conditions involved in the target navigation route.

In the above embodiment, the global road condition surface corresponding to the target navigation route can also be displayed on the initial navigation screen, so that the user can view various road conditions involved in the target navigation route at one time thereby improving the road condition viewing efficiency.

In an embodiment, the method for presenting roading conditions further includes refreshing the gradual transitioning road surface to display an updated road condition surface in case that the road condition of the current road section changes. The updated road condition surface is used to indicate the updated road conditions of the current road section.

Particularly, the road condition information can be updated regularly or in real time, and the initial road condition textures corresponding to the first road condition and the second road condition, the corresponding road condition transition range and the gradual transitioning road texture can be updated as the road condition information is updated. Correspondingly, the gradual transitioning road surface can be updated as the road condition information is updated. Therefore, in case that the road condition of the current road section changes, the terminal can refresh the gradual transitioning road surface to display an updated road condition surface, so as to ensure the accuracy of road condition display.

In an embodiment, to increase the response speed, after the target navigation route is determined, various road conditions involved in the target navigation route can be acquired, the road condition transition range between adjacent road conditions and the corresponding gradual transitioning road texture can be calculated. Subsequently, in response to the navigation trigger event for the target navigation route, the initial road condition textures corresponding to the first road condition and the second road condition involved in the current road section and the gradual transitioning road texture corresponding to the road condition transition range between the first road condition and the second road condition are directly acquired to generate the gradual transitioning road surface corresponding to the current road section, so that the gradual transitioning road surface can be quickly displayed on the target navigation screen. Subsequently, in case that the road condition of the current road section is detected to change, the initial road condition texture of the latest road condition of the current road section is acquired to generate an updated road condition surface, and the gradual transitioning road surface is refreshed to display the updated road condition surface.

In the above embodiment, in case that the road condition of the current road section changes, the gradual transitioning road surface is refreshed to display the updated road condition surface, which can ensure the timeliness of the presented road condition information, always show the latest road condition information to the user, and improve the display accuracy of the road condition information.

In an embodiment, the displaying, on the target navigation screen, a gradual transitioning road surface corresponding to a current road section in the target navigation route, includes displaying a first texture color corresponding to the first road condition in a starting area of the current road section; displaying a transitional texture color gradually changing from a first texture color to a second texture color in a middle area between the starting area and an ending area of the current road section, where the transitional texture color includes a dynamic number of gradually changing texture colors, and the number of the gradually changing texture colors is determined based on the road condition transition range; and displaying a second texture color corresponding to the second road condition in the ending area of the current road section.

The road condition texture can be indicated by a color, and the color used to characterize the road condition texture can be called texture color. The first texture color refers to the texture color corresponding to the first road condition, and the second texture color refers to the texture color corresponding to the second road condition. The transitional texture color includes multiple gradually changing texture colors gradually changing from the first texture color to the second texture color, to realize color transition between different colors. The transitional texture color includes a dynamic number of gradually changing texture colors, and the number of the gradually changing texture colors is determined based on the road condition transition range. It is to be understood that as the road condition transition range increases, the number of gradually changing texture colors included in the transitional texture color increases.

The starting area of the current road section refers to an area containing the starting location of the current road section. The ending area of the current road section refers to an area containing the ending location of the current road section. The middle area refers to an area on the current road section that is located between the starting area and the ending area of the current road section.

Particularly, the initial road condition texture and the gradual transitioning road texture can be presented in different areas on the current road section, so as to present a display effect gradually changing from the initial road condition texture of the first road condition to the initial road condition texture of the second road condition on the current road section. Specifically, the first texture color corresponding to the first road condition can be displayed in the starting area of the current road section, to indicate that the road condition of the current road section starts from the first road condition. The second texture color corresponding to the second road condition can be displayed in the ending area of the current road section, to indicate that the road condition of the current road section ends at the second road condition. The transitional texture color gradually changing from the first texture color to the second texture color is displayed in the middle area between the starting area and the ending area of the current road section, to indicate that the road condition of the current road section gradually changes from the first road condition to the second road condition.

In the above embodiment, the first texture color corresponding to the first road condition is displayed in the starting area of the current road section; the transitional texture color gradually changing from the first texture color to the second texture color is displayed in the middle area between the starting area and the ending area of the current road section, and the second texture color corresponding to the second road condition is displayed in the ending area of the current road section. As such, different road conditions are distinguished by different colors, color transition between road conditions is realized by transitional colors, and the process of the current road section transitioning from the first road condition to the second road condition is presented by rich colors. The transitional texture color includes a dynamic number of gradually changing texture colors, and the number of the gradually changing texture colors is determined based on the road condition transition range, which can ensure the self-adaptive color transition in the presence of combinations of various road conditions.

In an embodiment, as shown in FIG. 8, a method for presenting roading conditions is provided. For example, this method is applied to a computer device, which can be a terminal or a server. The method can be implemented by the terminal or the server itself alone or implemented through the interaction between the terminal and the server. Referring to FIG. 9, the method for presenting roading conditions includes the following steps:

Step S802: Acquire initial road condition textures and road condition coverage ranges respectively corresponding to a first road condition and a second road condition involved in a current road section.

The current road section can be any road section with different road conditions. The current road section can be a road section determined by a user through an operation of the terminal, for example, a road section inputted or selected by the user through an operation of the terminal, or a road section determined from a target navigation route based on a positioned location of the terminal when the user triggers route navigation through the terminal.

The initial road condition texture refers to an initialized and fixed road condition texture, which is used to visually distinguish different road conditions upon display. The road condition coverage range refers to a road section range corresponding to a single road condition, which is used to indicate the initial coverage range of the initial road condition texture on the road section.

Particularly, the computer device can acquire the initial road condition textures and the road condition coverage ranges respectively corresponding to the first road condition and the second road condition involved in the current road section locally or from other devices; and generate road section texture data corresponding to the current road section based on the initial road condition textures and the road condition coverage ranges respectively corresponding to the first road condition and the second road condition, where the road section texture data is used to generate a gradual transitioning road surface corresponding to the current road section.

Step S804: Determine a road condition transition range between the first road condition and the second road condition based on the initial road condition textures and the road condition coverage ranges respectively corresponding to the first road condition and the second road condition.

The road condition transition range refers to a road section range where the road condition texture transition is needed, and is used to indicate the coverage range of the gradual transitioning road texture on the road section.

Particularly, the computer device can determine the road condition transition range between the first road condition and the second road condition based on the initial road condition textures and the road condition coverage ranges respectively corresponding to the first road condition and the second road condition. Particularly, the road condition transition range between the first road condition and the second road condition can be determined based on the initial road condition textures and the road condition coverage ranges respectively corresponding to the first road condition and the second road condition.

In an embodiment, a target coverage range is determined from the road condition coverage ranges respectively corresponding to the first road condition and the second road condition, a road condition span is determined based on the initial road condition textures respectively corresponding to the first road condition and the second road condition, and the target coverage range is adjusted based on the road condition span, to obtain the road condition transition range. Particularly, a road condition coverage range with smaller coverage amount can be selected from the road condition coverage ranges respectively corresponding to the first road condition and the second road condition and used as the target coverage range, and the target coverage range is narrowed based on the road condition span, to obtain the road condition transition range. For example, the road condition transition range decreases with the decrease of the road condition span. The smaller the road condition span is, the larger the range narrowing value used to narrow the range will be, and the smaller the obtained road condition transition range will be. It is to be understood that in case of a smaller road condition span, a relatively smaller road condition transition range can be used to effectively reflect the texture transition between different road conditions.

Step S806: Adjust the road condition texture over gradual changes from the initial road condition texture corresponding to the first road condition to the initial road condition texture corresponding to the second road condition, to obtain a gradual transitioning road texture corresponding to the road condition transition range.

The gradual transitioning road texture is a road condition texture set including a variety of road condition textures changing regularly, which is used to visually present a gradually changing transitional effect between road conditions upon display. The gradual transitioning road texture corresponding to the road condition transition range between the first road condition and the second road condition includes: a road condition texture set including multiple road condition textures that regularly change from the initial road condition texture corresponding to the first road condition to the initial road condition texture corresponding to the second road condition.

Particularly, to achieve a gradual change effect, the computer device adjusts the road condition texture over gradual changes from the initial road condition texture corresponding to the first road condition to the initial road condition texture corresponding to the second road condition, to obtain multiple road condition textures regularly changing between the first road condition texture and the second road condition texture; and combines these regularly changing road condition textures into a gradual transitioning road texture corresponding to the road condition transition range, where the gradual transitioning road texture can be used to realize a gradual change effect from the first road condition texture to the second road condition texture.

Step S808: Obtain road section texture data corresponding to the current road section based on the initial road condition textures and corresponding road condition coverage ranges, and the gradual transitioning road texture and corresponding road condition transition range. The road section texture data is used to generate the gradual transitioning road surface corresponding to the current road section. The gradual transitioning road surface is used to indicate the process of the current road section transitioning from the first road condition to the second road condition.

The road section texture data refers to the complete texture data corresponding to the current road section, and the road section texture data includes a first road condition texture, a gradually changing texture data, and a second road condition texture arranged in order, to present a texture transition effect from the first road condition to the second road condition.

Particularly, the computer device obtains the road section texture data corresponding to the current road section based on the initial road condition textures and corresponding road condition coverage ranges, and the gradual transitioning road texture and corresponding road condition transition range. The initial road condition textures and the gradual transitioning road texture can be arranged and combined according to the corresponding road condition coverage ranges and road condition transition range, to obtain the road section texture data corresponding to the current road section. According to the order of the road condition coverage range corresponding to the first road condition texture, the road condition coverage range corresponding to the second road condition texture and the road condition transition range corresponding to the gradually changing texture data, the first road condition texture, the second road condition texture and the gradually changing texture data are combined in order, to obtain the road section texture data corresponding to the current road section. In the road section texture data, the first road condition texture, the second road condition texture and the gradually changing texture data have corresponding coverage ranges respectively.

The road section texture data is used to generate the gradual transitioning road surface corresponding to the current road section. In case of generating the gradual transitioning road surface, the road condition textures can be added to the road surface in order according to the road section texture data, to obtain the gradual transitioning road surface. The gradual transitioning road surface can be presented on the terminal.

In an embodiment, road geometric data corresponding to the current road section can be acquired, and the gradual transitioning road surface is generated based on the road geometric data and the road section texture data. Road geometric data is used to characterize the geometric information of the road, for example, the shape and size of the road. Road geometric data is used to generate the road surface. The road section texture data is used to characterize the road condition texture information of the road, and the road section texture data is used to determine the displayed texture of the road surface. A gradual transitioning road surface conforming to the road geometry can be generated based on the road geometric data and the road section texture data.

In an embodiment, the road geometric data includes multiple road geometric points used for drawing the road. Based on relative positions of the road geometric points in the road section, texture sampling is carried out in the road section texture data, to obtain target road condition textures corresponding to various road geometric points. The gradual transitioning road surface is generated based on the target road condition textures and relative locations respectively corresponding to various road geometric points.

In an embodiment, the road condition coverage ranges corresponding to the first road condition and the second road condition are adjusted based on the road condition transition range, to obtain updated coverage ranges corresponding to the first road condition and the second road condition. The updated coverage range is used to indicate the target coverage range and final coverage range of the initial road condition texture on the road section. Based on the road condition transition range and the updated coverage ranges, the first road condition texture, the second road condition texture and the gradual transitioning road texture are arranged and combined, to obtain the road section texture data.

In the road condition processing method, the initial road condition textures and the road condition coverage ranges respectively corresponding to the first road condition and the second road condition involved in the current road section are acquired; the road condition transition range between the first road condition and the second road condition is determined based on the initial road condition textures and the road condition coverage ranges respectively corresponding to the first road condition and the second road condition; the road condition texture is adjusted over gradual changes from the initial road condition texture corresponding to the first road condition to the initial road condition texture corresponding to the second road condition, to obtain the gradual transitioning road texture corresponding to the road condition transition range; and the road section texture data corresponding to the current road section is obtained based on the initial road condition textures and corresponding road condition coverage ranges, and the gradual transitioning road texture and corresponding road condition transition range. The road section texture data is used to generate the gradual transitioning road surface corresponding to the current road section. The gradual transitioning road surface is used to indicate the process of the current road section changing from a first road condition to a second road condition. As such, the road section texture data obtained based on the initial road condition textures, the gradual transitioning road texture, the road condition coverage ranges and the road condition transition range can be used to generate the gradual transitioning road surface. The initial road condition textures are used to distinguish different road conditions. The gradual transitioning road texture is used to reflect the changing process between different road conditions. The road condition coverage ranges, and the road condition transition range can determine the coverage ranges of the initial road condition textures and the gradual transitioning road texture. Therefore, the gradual transitioning road surface generated can realize a smooth gradual change effect between different road conditions. The generated gradual transitioning road surface can reflect the process of the current road section gradually transitioning from the first road condition to the second road condition, so that the presentation of the road condition information is more in line with the real road scenarios, thereby improving the accuracy of road condition presentation and improving the accuracy of navigation.

In an embodiment, Step S804 includes determining a target coverage range from the road condition coverage ranges respectively corresponding to the first road condition and the second road condition; determining a road condition span based on the difference between the initial road condition textures corresponding to the first road condition and the second road condition; obtaining a road condition texture gradual change radius based on a reference road condition gradual change range corresponding to the road condition span and the target coverage range; and obtaining the road condition transition range based on a dividing location between the first road condition and the second road condition and the road condition texture gradual change radius.

Different road condition spans correspond to different reference road condition gradual change ranges. The reference road condition gradual change range is the maximum road condition gradual change range preset for the road condition span.

Particularly, the computer device can determine the road condition texture gradual change radius based on the difference in road condition coverage range and initial road condition texture between the first road condition and the second road condition. The difference in initial road condition texture between the first road condition and the second road condition can be reflected by the road condition span. Based on the road condition texture gradual change radius, a range is defined at the road condition dividing position of the first road condition and the second road condition, to obtain the road condition transition range between the first road condition and the second road condition.

First, the computer device can acquire a road condition coverage range with smaller coverage amount from the road condition coverage ranges respectively corresponding to the first road condition and the second road condition and take it as the target coverage range. The target coverage range is used to constrain the road condition transition range, so that the road condition transition range does not exceed the target coverage range. Meanwhile, the computer device can determine the road condition span between the first road condition and the second road condition based on the difference between the initial road condition textures corresponding to the first road condition and the second road condition, and obtain the reference road condition gradual change range corresponding to the road condition span. The reference road condition gradual change range is used to constrain the road condition transition range, so that the road condition transition range does not exceed the reference road condition gradual change range. Finally, the computer device determines the road condition texture gradual change radius based on the reference road condition gradual change range corresponding to the road condition span and the target coverage range, and obtains a range with the minimum coverage amount from the reference road condition gradual change range and the target coverage range to generate the road condition texture gradual change radius. The road condition transition range generated based on the road condition texture gradual change radius is such that the road condition transition range does not exceed the target coverage range, and the road condition transition range does not exceed the reference road condition gradual change range.

In an embodiment, the road condition transition range is calculated by a formula below:

$$\text{radius} = \min\left(\frac{\min(\Delta(i+1),\, \Delta i)}{2},\, \frac{len(i,\, i+1)}{2}\right)$$

$$\Delta(i+1) = n*c - n*b$$

$$\Delta(i) = n*b - n*a$$

$$len(i,\, i+1) = \text{value} * \text{span}(i,\, i+1)$$

where the road section coverage range of the current road section is represented by an array of 1 row and n columns. The road condition information corresponding to an i-th road condition is presented by (a, b, road condition i), indicating that the i-th road condition covers from the column $n*a$ to the column $n*b$ in the array. The road condition information corresponding to an i+1-th road condition is presented by (b, c, road condition i+1), indicating that the i+1-th road condition covers from the column $n*b$ to the column $n*c$ in the array. Therefore, $\Delta(i)$ represents the coverage amount of the road condition coverage range corresponding to the i-th road condition, $\Delta(i+1)$ represents the coverage amount of the road condition coverage range corresponding to the i+1-th road condition, and span (i, i+1) represents the span between the road condition i and the road condition i+1. value represents the maximum road condition gradual change range corresponding to a span of 1, len(i,i+1) represents the maximum road condition gradual change range corresponding to the span between the road condition i and the road condition i+1 (that is, the reference road condition gradual change range between the road condition i and the road condition i+1).

radius represents the road condition texture gradual change radius, the road condition dividing position is $n*b$, and the gradual change range is from $n*b-\text{radius}$ to $n*b+\text{radius}$, indicating that the gradual change coverage range is from the column $n*b-\text{radius}$ to the column $n*b+\text{radius}$ in the array.

Further, the number n of columns can be selected according to the length of the road section, and n increases with the increase of the length of the road section.

In an embodiment, the reference road condition gradual change range corresponding to the road condition span is less than or equal to a texture gradual change range corresponding to the road condition span in a candidate road condition texture set. The candidate road condition texture set includes multiple road condition textures arranged in order, and the multiple road condition textures arranged in order include initial road condition textures respectively corresponding to multiple different road conditions and at least one transitional road condition texture between different initial road condition textures. The texture gradual change range corresponding to the road condition span between the first road condition and the second road condition in the candidate road condition texture set refers to the road condition texture range determined by the initial road condition textures corresponding to the first road condition and the second road condition in the candidate road condition texture set. The road condition texture range includes the initial road condition textures corresponding to the first road condition and the second road condition, and various road condition textures between the initial road condition textures corresponding to the first road condition and the second road condition.

For example, the road condition texture is indicated by a color, and the candidate road condition texture set includes all the road condition textures. As shown in FIG. 9, the candidate road condition texture set involves 5 road conditions, namely, no road condition, smooth traffic, slow traffic, congested and severely congested. The candidate road condition texture set includes texture colors arranged in order. In the candidate road condition texture set, each road condition has a corresponding texture color, and there is a color transition between different road conditions. For the texture colors from left to right, Sample(0)=no road condition, Sample(0.25)=smooth traffic, Sample(0.5)=slow traffic, Sample(0.75)=congested, Sample(1)=severely congested, Sample(i) represents the road condition information indicated by color obtained from the candidate road condition texture set, i represents the percentage position of the texture color texture, and the area between adjacent road condition represents the transition between road conditions. The pixel gradual change range between different road conditions is limited, so the pixel gradual change range between different road conditions can be regarded as the texture gradual change range corresponding to the road condition span between different road conditions.

In the above embodiment, the road condition texture gradual change radius is determined based on the difference in road condition coverage range and initial road condition texture between the first road condition and the second road condition. Based on the road condition texture gradual change radius, a range is defined at the road condition dividing position of the first road condition and the second road condition, to quickly obtain the road condition transition range between the first road condition and the second road condition. The target coverage range is determined from the road condition coverage ranges respectively corresponding to the first road condition and the second road condition. The road condition texture gradual change radius is obtained based on a reference road condition gradual change range corresponding to the road condition span between the first road condition and the second road condition and the target coverage range. The road condition transition range generated based on the road condition texture gradual change radius is such that the road condition transition range does not exceed the target coverage range, and the road condition transition range does not exceed the reference road condition gradual change range.

In an embodiment, Step S806 includes taking various location points included in the road condition transition range respectively as a target location point; determining a road condition texture variation of the target location point relative to a starting location point of the road condition transition range based on a distance between the target location point and the starting location point, and obtaining a target road condition texture corresponding to the target location point based on an initial road condition texture corresponding to the starting location point and the road condition texture variation of the target location point relative to the starting location point; and obtaining the gradual transitioning road texture corresponding to the road condition transition range based on the target road condition textures respectively corresponding to various location points.

The road condition transition range includes multiple location points arranged in order. The location points can divide the road condition transition range into multiple small areas, and the target road condition textures respectively corresponding to various location points are determined and combined to obtain the gradual transitioning road texture.

It is to be understood that the initial road condition texture corresponding to the starting location point of the road condition transition range is the first road condition texture. Correspondingly, an initial road condition texture corresponding to the ending location point of the road condition transition range is the second road condition texture.

Particularly, in case that the gradual transitioning road texture corresponding to the road condition transition range is generated, the target road condition textures respectively corresponding to various location points are determined, and then the target road condition textures respectively corresponding to various location points are combined into the gradual transitioning road texture corresponding to the road condition transition range.

The computer device takes various location points included in the road condition transition range respectively as the target location point, and determines the target road condition texture corresponding to each of the target location points. For any of the target location points, based on the distance between the target location point and the starting location point of the road condition transition range, the road condition texture variation of the target location point relative to the starting location point is determined. Particularly, a maximum texture variation can be determined based on the difference between the initial road condition textures corresponding to the starting location point and the ending location points of the road condition transition range, and the road condition texture variation corresponding to the distance between the target location point and the starting location point is determined from the maximum texture variation. For example, the ratio of the distance between the target location point and the starting location point to the total distance between the starting location point and the ending location point is calculated, and the road condition texture variation of the target location point relative to the starting location point is obtained based on a product of this ratio and the maximum texture variation. For any of the target location points, based on the initial road condition texture corresponding to the starting location point and the road condition texture variation, the target road condition texture corresponding to the target location point is obtained. For example, the initial road condition texture and the road condition texture variation are added to obtain the target road condition texture.

In an embodiment, in case that the gradual change coverage range is from n*b−radius to n*b+radius, for a location j in the gradual change coverage range, a texture sampling location of the position j in the candidate road condition texture set is $$\left( Loc(i) + \frac{(Loc(i+1) - Loc(i)) * (j - n * b + \text{radius})}{2 * \text{radius}} \right),$$

where Loc(i) represents a texture sampling location of a road condition i in the candidate road condition texture set, and Loc(i+1) represents a texture sampling location of a road condition i+1 in the road condition texture set.

In the above embodiment, based on the distance between the location points included in the road condition transition range and the starting location point, the road condition texture variation of the target location point relative to the starting location point is determined. Based on the initial road condition texture corresponding to the starting location point and the road condition texture variation, the target road condition texture corresponding to the target location point is obtained. The target road condition textures corresponding to various location points are evenly changed from the first road condition texture to the second road condition texture according to the locations in the road condition transition range. Accordingly, the finally obtained gradual transitioning road texture includes multiple road condition textures evenly gradually transitioning from the first road condition texture to the second road condition texture. Such a gradual transitioning road texture helps to ensure a gradually changing transitional effect in the display of the road condition.

In an embodiment, as shown in FIG. 10, the road condition processing method further includes:

Step S1002: Acquire edge line point locations of various road edge line points corresponding to the current road section, and determine texture sampling ratios corresponding to the road edge line points based on the edge line point locations of the road edge line points. In embodiments consistent with this disclosure, an edge line may refer to the edge line on a road or highway, or a lame line on a road or highway.

Step S1004: Perform texture sampling in the road section texture data based on the texture sampling ratios corresponding to the road edge line points, to obtain target road condition textures respectively corresponding to various road edge line points.

Step S1006: Generate a gradual transitioning road surface based on the target road condition textures and the edge line point locations corresponding to the various road edge line points.

The road edge line point is a spatial geometric point used to form the road edge line. The road edge line is a boundary line of the road. The edge line point location is used to characterize the spatial location of the road edge line point. The texture sampling ratio corresponding to the road edge line points can be determined based on the edge line point locations of the road edge line points. The texture sampling ratio can characterize the edge line location of the road edge line point on the road edge line, and is used for texture sampling from the road section texture data.

Particularly, to generate an irregular and gradual transitioning road surface that conforms to the road morphology, road edge line points for forming the road edge line are obtained, target road condition textures corresponding to various road edge line points are determined from the road section texture data, and an irregular road surface having a gradually changing texture and a specific morphology is generated based on the target road condition textures and the edge line point locations corresponding to the various road edge line points.

The computer device can determine the locations of the road edge line points on the road edge line based on the edge line point locations of the road edge line points, to obtain the texture sampling ratios corresponding to various road edge line point, and further perform texture sampling in the road section texture data based on the texture sampling ratios corresponding to the road edge line points, to obtain the target road condition textures respectively corresponding to the various road edge line points. The road section texture data includes multiple road condition textures arranged in order from a starting point to an ending point of the road. The target road condition texture is obtained by sampling from the road section texture data based on the texture sampling ratios of the road edge line points. During the texture presentation, the target road condition texture is rendered according to the edge line locations of the road edge line points, to finally present a texture effect that is gradually changing and transitional from the starting point to the ending point of the road.

In case of generating the gradual transitioning road surface, the edge line point locations of the road edge line points are used to form the road surface, the target road condition textures of the road edge line points are used to form the road surface texture, and the edge line point locations of the road edge line points and the target road condition textures are combined to finally obtain a road surface having texture.

In an embodiment, the road section texture data of the current road section is represented by an array of 1 row and n columns. The road condition coverage range corresponding to the first road condition corresponds to column 0 to column n*a in the array, and the road condition coverage range corresponding to the second road condition corresponds to column n*a to column n in the array. The road condition transition range is determined based on relevant information of the first road condition and the second road condition corresponds to column n*a−radius to column n*a+radius in the array. Referring to the road condition transition range, the final coverage range corresponding to the first road condition corresponds to column 0 to column n*a−radius in the array, and the final coverage range corresponding to the second road condition corresponds to column n*a+radius to column n in the array. Column 0 to column n*a−radius correspond to the first road condition texture, column n*a−radius to column n*a+radius correspond to the gradual transitioning road texture, and column n*a+radius to column n correspond to the second road condition texture. In case that the texture sampling ratio corresponding to a certain road edge line point is m, the road condition texture corresponding to column n*m are acquired from the array and used as the target road condition texture corresponding to the road edge line point.

In the above embodiment, the edge line point locations of various road edge line points corresponding to the current road section are acquired. The texture sampling ratios corresponding to the road edge line points are determined based on the edge line point locations of the road edge line points. Texture sampling is performed in the road section texture data based on the texture sampling ratios corresponding to the road edge line points, to obtain the target road condition textures respectively corresponding to the various road edge line points. An irregular road surface having a gradually changing texture and a specific morphology can be generated based on the target road condition textures and the edge line point locations corresponding to the various road edge line points.

In an embodiment, the road edge line points include left road edge line points and right road edge line points. The determining the texture sampling ratios corresponding to the road edge line points based on the edge line point locations of the road edge line points include dividing a left road edge line and a right road edge line of the current road section into a first-type edge line and a second-type edge line; calculating length ratios of various cumulative distances on the first-type edge line based on the cumulative distances of various road edge line points on the first-type edge line from a starting point of the road edge line, to obtain the texture sampling ratios respectively corresponding to various road edge line points on the first-type edge line; performing ratio alignment on the road edge line points on the second-type edge line based on the texture sampling ratios and the edge line point locations corresponding to the road edge line points on the first-type edge line, and the edge line point locations corresponding to the left road edge line points on the second-type edge line, to obtain the texture sampling ratios respectively corresponding to various road edge line points on the second-type edge line.

The ratio alignment serves to align the texture sampling ratios of one road edge line with another road edge line as a reference, so that the road edge line points on the left and right road edge lines in the same horizontal direction can correspond to the same texture sampling ratio. It is to be understood that the locations on the left road edge line and the right road edge line in the same horizontal direction correspond to the same road condition texture, and the road condition texture on the gradual transitioning road surface generated based on this is flatly aligned in the horizontal direction, thus avoiding the inclination of the road condition texture on the gradual transitioning road surface.

Particularly, the computer device divides a left road edge line and a right road edge line of the current road section into a first-type edge line and a second-type edge line. The first-type edge line is used as a reference, and the second-type edge line is used to align with the first-type edge line. For example, the right road edge line is used as the first-type edge line, and the left road edge line is used as the second-type edge line; or the left road edge line is used as the first-type edge line, and the right road edge line is used as the second-type edge line. For the first-type edge line of the current road section, the texture sampling ratios respectively corresponding to various road edge line points on the first-type edge line are determined. Considering that the road edge line is obtained by connecting the road edge line points sequentially, the computer device can calculate length ratios of various cumulative distances on the first-type edge line based on the cumulative distances of various road edge line points on the first-type edge line from a starting point of the road edge line, and take the length ratios as the texture sampling ratios, to obtain the texture sampling ratios respectively corresponding to various road edge line points on the first-type edge line. Then, with reference to the edge line point locations and texture sampling ratios of the road edge line points on the first-type edge line, the computer device performs ratio alignment on the road edge line points on the second-type edge line based on the edge line point locations corresponding to the road edge line points on the second-type edge line, to obtain the texture sampling ratios respectively corresponding to various road edge line points on the second-type edge line.

For example, the first-type edge line is the right road edge line, and the second-type edge line is the left road edge line. First, the length ratios of various cumulative distances on the right road edge line are calculated based on the cumulative distances of various right road edge line points from a starting point of the right road edge line, and the length ratios are taken as the texture sampling ratios, to obtain the texture sampling ratios respectively corresponding to various right road edge line points. Then, with reference to the edge line point locations and the texture sampling ratios of the right road edge line points, the computer device performs ratio alignment on the left road edge line points based on the edge line point locations corresponding to the left road edge line points, to obtain the texture sampling ratios respectively corresponding to various left road edge line points.

In an embodiment, for example, the first-type edge line is the right road edge line, the second-type edge line is the left road edge line, the texture sampling ratio corresponding to the right edge line starting point is used as the texture sampling ratio corresponding to the left edge line starting point, and the texture sampling ratio corresponding to the right edge line ending point is used as the texture sampling ratio corresponding to the left edge line ending point. Based on the edge line locations of the left edge line points on the left edge line, initial sampling ratios corresponding to the left edge line points are determined in a texture sampling ratio interval formed the texture sampling ratio corresponding to the left edge line starting point to the texture sampling ratio corresponding to the right edge line ending point. The initial sampling ratios corresponding to the left edge line points are adjusted based on the length of the left road edge line and the length of the right road edge line, to obtain the texture sampling ratios corresponding to the left edge line points. It is to be understood that in case that the first-type edge line is the left road edge line, and the second-type edge line is the right road edge line, the data processing process is similar.

In the above embodiment, the length ratios of various cumulative distances on the first-type edge line are calculated based on the cumulative distances of various road edge line points on the first-type edge line from the starting point of the road edge line, to obtain the texture sampling ratios respectively corresponding to various road edge line points on the first-type edge line. In the presentation of the target road condition textures obtained by sampling the texture sampling ratios corresponding to the road edge line points on the first-type edge line, in the order from the starting point to the ending point of the first-type edge line, the first road condition texture is presented first, then the first road condition texture is gradually changed to the second road condition texture, and finally the second road condition texture is presented. Further, the road edge line points on the left and right road edge lines in the same horizontal direction can be made to correspond to the same texture sampling ratio by ratio alignment. In the presentation of the road condition textures obtained by sampling the texture sampling ratios respectively corresponding to the right road edge line points and the left road edge line points, the texture of the road condition surface is flatly aligned in the horizontal direction, so that the inclination of the road condition texture on the road condition surface is effectively avoided, and the road condition texture can be well displayed even at a road corner.

In an embodiment, based on the texture sampling ratios and the edge line point locations corresponding to the road edge line points on the first-type edge line, and the edge line point locations corresponding to the left road edge line points on the second-type edge line, the performing ratio alignment on the road edge line points on the second-type edge line to obtain the texture sampling ratios respectively corresponding to various road edge line points on the second-type edge line includes acquiring a road centerline corresponding to the current road section; dividing the current road section based on the road centerline, to obtain at least two areas; and performing ratio alignment on the road edge line points belonging to the second-type edge line in the area based on the texture sampling ratios and edge line point locations corresponding to the road edge line points belonging to the first-type edge line and the edge line point locations corresponding to road edge line points belonging to the second-type edge line in the same area, to obtain the texture sampling ratios respectively corresponding to various road edge line points on the second-type edge line.

The road centerline is a road marker line located at the center of the road, which can reflect the plane locations and curvature changes of the road.

Particularly, to improve the accuracy and efficiency of ratio alignment, ratio alignment can be carried out in different areas. The computer device can divide the current road section based on the road centerline corresponding to the current road section, to obtain at least two areas, and perform ratio alignment respectively in each area. Based on the texture sampling ratios and edge line point locations corresponding to the road edge line points belonging to the first-type edge line and the edge line point locations corresponding to road edge line points belonging to the second-type edge line in the same area, the computer device performs ratio alignment on the road edge line points belonging to the second-type edge line in the area, to obtain the texture sampling ratios respectively corresponding to various road edge line points belonging to the second-type edge line in various areas. For example, based on the texture sampling ratios and edge line point locations corresponding to the right road edge line points and the edge line point locations corresponding to the left road edge line points in the same area, ratio alignment is performed on the left road edge line points in the area, to obtain the texture sampling ratios respectively corresponding to the left road edge line points in various areas. The texture sampling ratios respectively corresponding to the left road edge line points in various areas constitute the texture sampling ratios respectively corresponding to various left road edge line points in the current road section.

In the above embodiment, the current road section is divided based on the road centerline, to obtain at least two areas, and ratio alignment is carried out in different areas, to improve the efficiency of ratio alignment.

In an embodiment, the dividing the current road section based on the road centerline to obtain at least two areas includes sampling the road centerline, to obtain multiple central sampling points; determining the direction of a dividing line based on the central sampling point and a corresponding adjacent sampling point, to obtain the direction of the dividing line respectively corresponding to each central sampling point; generating an area dividing line passing through the central sampling point in the direction of the dividing line, to obtain an area dividing line respectively corresponding to each central sampling point; and dividing the current road section based on each area dividing line to obtain at least two areas.

Figure 11A:
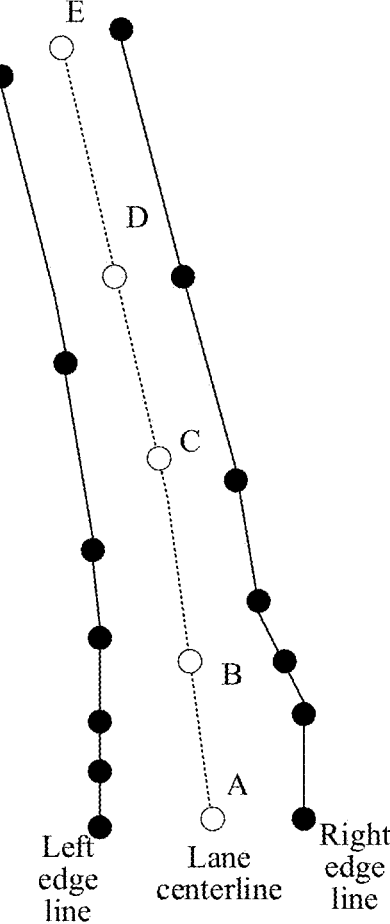
FIG. 11A is a schematic diagram of a road edge line and a road centerline in an embodiment.

The adjacent sampling point of the central sampling point includes at least one other central sampling point adjacent to the central sampling point in a different direction of the road centerline. For example, referring to FIG. 11A, the road center line is sampled to obtain the central sampling points A-E, in which the central sampling point A is the starting point of the road centerline. For example, for the central sampling point B, the central sampling points A and C are adjacent sampling points of the central sampling point B, the central sampling point A is a forward adjacent sampling point of the central sampling point B, and the central sampling point C is a backward adjacent sampling point of the central sampling point B.

Particularly, the areas can be divided based on the sampling points obtained by sampling the road centerline. The computer device can sample the road centerline to obtain multiple central sampling points, generate an area dividing line based on the central sampling points, and then divide the current road section to obtain at least two areas. An area dividing line can be determined by the central sampling point and the corresponding direction of the dividing line, and the straight line passing through the central sampling point in the direction of the dividing line is taken as the area dividing line. The direction of the dividing line corresponding to a central sampling point is determined based on the central sampling point and the corresponding adjacent sampling points.

In an embodiment, the direction of a bisector of the angle formed by the central sampling point and the forward and backward adjacent sampling points can be taken as the direction of the dividing line. The normal direction of a straight line formed by the central sampling point and the forward adjacent sampling point, or the backward adjacent sampling point can be taken as the direction of the dividing line.

Figure 11B:
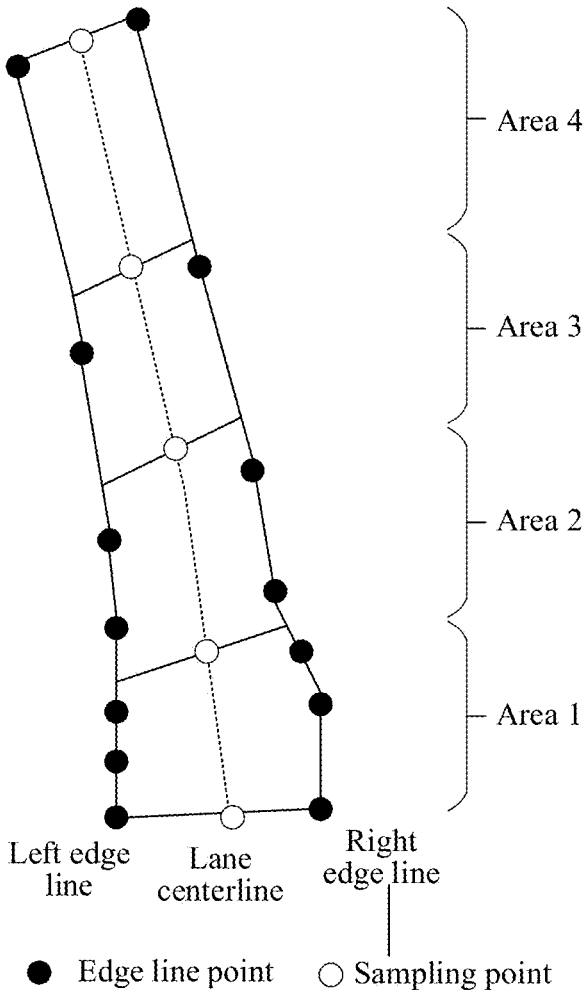
FIG. 11B is a schematic diagram showing area division in an embodiment.

Referring to FIG. 11B, equidistant sampling is performed on the centerline of the lane, and intersection points of a straight line passing through the central sampling point in the direction of the dividing line with the left and right edge lines of the lane are obtained. The direction of the dividing line is the direction of a bisector of the angle formed by the central sampling point and the forward and backward adjacent sampling points on the centerline of the lane. The adjacent sampling points and the intersection points with the left and right edge lines of the lane divide the road condition surface into several areas.

In the above embodiment, based on the central sampling points obtained by sampling the road centerline and the direction of the dividing line determined by the central sampling point and the corresponding adjacent sampling points, the area dividing lines receptively corresponding to various central sampling points can be quickly obtained. The current road section can be divided along the road extension direction by dividing the current road section based on the various area dividing lines. The multiple areas obtained based on the area division contribute to the accurate gradual change and transition of the road condition texture along the road extension direction in the display of the road surface.

In an embodiment, the central sampling points are determined by any one of performing equidistant sampling on the road centerline, to obtain multiple central sampling points; or performing dynamic sampling on the road centerline according to the curvature of the road centerline, to obtain multiple central sampling points.

Particularly, in case that the road centerline is sampled, equidistant sampling can be performed on the road centerline, by sampling one point every preset distance on the road centerline, to obtain multiple central sampling points.

In case that the road centerline is sampled, dynamic sampling can also be performed on the road centerline according to the curvature of the road centerline, by sampling more points in an area with a larger curvature on the road centerline and less points in an area with a smaller curvature on the road centerline, to obtain multiple central sampling points.

In the above embodiment, multiple central sampling points can be quickly obtained by equidistant sampling of the road centerline. Multiple central sampling points can be obtained at different intervals by dynamic sampling of the road centerline according to the curvature of the road centerline. The area with a larger curvature has more central sampling points, that is, more detailed sampling is performed at a road corner, which is beneficial to the improvement of the accuracy of displaying the road condition texture at the road corner.

In an embodiment, the performing ratio alignment on the left road edge line points in the area based on the texture sampling ratios and the edge line point locations correspond-ing to the right road edge line points and the edge line point locations corresponding to the left road edge line points in the same area to obtain the texture sampling ratios respectively corresponding to various left road edge line points includes taking a road edge line starting point and a road edge line ending point belonging to the first-type edge line in a current area as a current first edge line starting point and a current first edge line ending point, and taking a road edge line starting point and a road edge line ending point belonging to the second-type edge line in the current area as a current second edge line starting point and a current second edge line ending point; taking the texture sampling ratio corresponding to the current first edge line starting point as the texture sampling ratio corresponding to the current second edge line starting point, and taking the texture sampling ratio corresponding to the current first edge line ending point as the texture sampling ratio corresponding to the current second edge line ending point; calculating a distance ratio corresponding to a current second edge line point based on cumulative distances of the current second edge line point belonging to the second-type edge line respectively from the current second edge line starting point and the current second edge line ending point in the current area; obtaining an initial sampling ratio corresponding to the current second edge line point based on the texture sampling ratios respectively corresponding to the current second edge line starting point and the current second edge line ending point and the distance ratio corresponding to the current second edge line point; and adjusting the initial sampling ratio corresponding to the current second edge line point based on the first-type edge line length and the second-type edge line length corresponding to the current area, to obtain a texture sampling ratio corresponding to the current second edge line point.

The current area is an area that is currently being processed. For example, the first-type edge line is the right road edge line, the second-type edge line is the left road edge line, the current first edge line starting point is the right road edge line starting point of the current area, and the current first edge line ending point is the right road edge line ending point of the current area; the current second edge line starting point is the left road edge line starting point of the current area, and the current second edge line ending point is the left road edge line ending point of the current area; the current second edge line point is a left edge line point that is currently being processed in the current area; and the first-type edge line length current corresponding to the current area is the right road edge line length of the current area, and the second-type edge line length corresponding to the current area is the left road edge line length of the current area.

Particularly, in case of ratio alignment area by area, for a current area, the texture sampling ratio corresponding to the current first edge line starting point is taken as the texture sampling ratio corresponding to the current second edge line starting point, and the texture sampling ratio corresponding to the current first edge line ending point is taken as the texture sampling ratio corresponding to the current second edge line ending point, so that the starting points of the left and right edge line starting points in an area correspond to the same texture sampling ratio, and the left and right edge line ending points correspond to the same texture sampling ratio. Then, the remaining various second edge line points belonging to the second-type edge line in the current area are respectively used as a current second edge line point, and the texture sampling ratios respectively corresponding to the various current second edge line points are calculated. For any current second edge line point, the distances of the current second edge line point respectively from the current second edge line starting point and the current second edge line ending point in the current area are calculated, and a ratio of the two distances is calculated to obtain a distance ratio corresponding to the current second edge line point. The distance ratio can indicate the location of the current second edge line point on the second edge line in the current area. Then, based on the texture sampling ratios respectively corresponding to the current second edge line starting point and the current second edge line ending point and the distance ratio corresponding to the current second edge line point, an initial sampling ratio corresponding to the current second edge line point is obtained. Specifically, the difference between the texture sampling ratios respectively corresponding to the current second edge line starting point and the current second edge line ending point can be calculated to obtain a maximum ratio variation, the maximum ratio variation multiplies the distance ratio to obtain a sampling ratio variation corresponding to the current second edge line point, and the initial sampling ratio corresponding to the current second edge line point is obtained based on the texture sampling ratio corresponding to the current second edge line starting point and the sampling ratio variation. The initial sampling ratio is a sampling ratio determined in a texture sampling ratio interval of the second edge line in the area, at the edge line location on the second edge line in the area based on the current second edge line starting point. In order to achieve the ratio alignment of the left and right edge lines, finally the initial sampling ratio corresponding to the current second edge line point is adjusted based on the first-type edge line length and the second-type edge line length corresponding to the current area, to obtain the texture sampling ratio corresponding to the current second edge line point. Specifically, a length ratio of the second road edge line length and the first road edge line length is calculated, and the initial sampling ratio and the length ratio are fused to obtain the texture sampling ratio.

Figure 12:
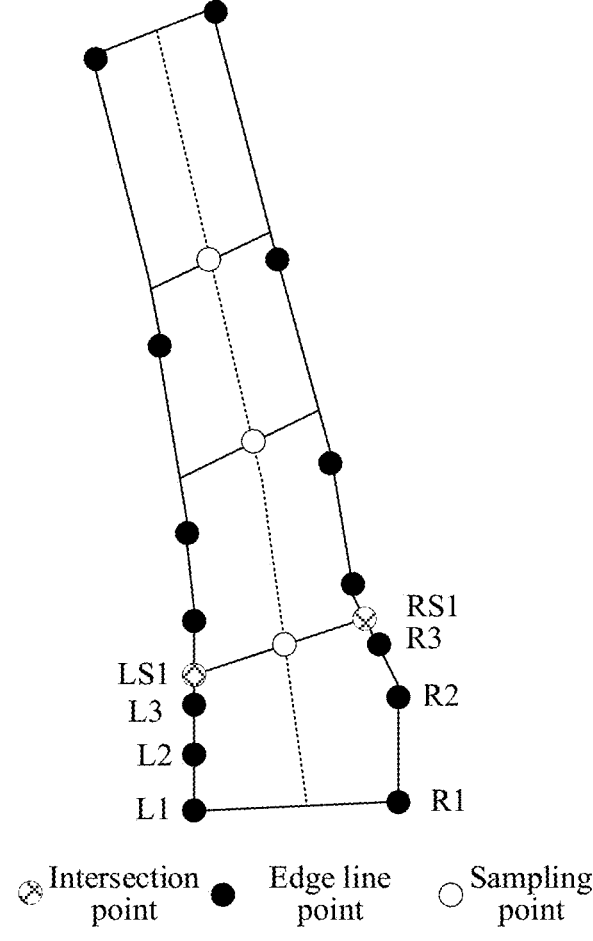
FIG. 12 is a schematic diagram showing ratio alignment in an embodiment.

In an embodiment, referring to FIG. 12, for example, the calculation process of ratio alignment in area 1 is described, in which the first-type edge line is the right road edge line, and the second-type edge line is the left road edge line. For area 1, the cumulative distance ADist of each of points R1, R2, R3, and RS1 from the right edge line starting point is calculated, where ADist(i)=ADist(i−1)+Dist(i, i−1), in which ADist(i) represents the cumulative distance of point i from the right edge line starting point, and Dist(i, i−1) represents the distance between point i and point i−1. It is assumed that the total length of the right edge line is RT, and the left and right edge line lengths of area 1 are LT1 and RT1. For the right edge line of area 1, the length ratio of each point on the right edge line of area 1 is respectively: Ratio(i)=ADist(i)/RT. For the left edge line of area 1, the texture sampling ratios corresponding to the starting point L1 and the ending point LS1 of the area are set to Ratio(R1) and Ratio(RS1) respectively. The texture sampling ratio corresponding to other point Li in area 1 is set to Ratio(Li) =(Ratio(L1)+(Ratio(LS1)−Ratio(L1))*k)*LT1/RT1, where k=(ADist(Li)−ADist(L1))/(ADist(LS1)−ADist(L1)), ADist (Li)=ADist(Li−1)+Dist(Li, Li−1), and Dist(Li, Li−1) represents the distance between point i on the left edge line and point i−1 on the left edge line. Finally, the ratio alignment of the left and right edge lines of area 1 is completed according to the right edge line, and remaining areas of the current road section can be processed in the same way.

In the above embodiment, the texture sampling ratio corresponding to the current first edge line starting point is taken as the texture sampling ratio corresponding to the current second edge line starting point, and the texture sampling ratio corresponding to the current first edge line ending point is taken as the texture sampling ratio corresponding to the current second edge line ending point, so that the ratios of the left and right edge line starting points and the left and right edge line ending points of the area are aligned. Based on cumulative distances of a current second edge line point from the current second edge line starting point and the current second edge line ending point in the current area, a distance ratio corresponding to the current second edge line point is calculated. Based on the texture sampling ratios respectively corresponding to the current second edge line starting point and the current second edge line ending point and the distance ratio corresponding to the current second edge line point, an initial sampling ratio corresponding to the current second edge line point is obtained. Based on the left road edge line length and the right road edge line length corresponding to the current area, the initial sampling ratio corresponding to the current second edge line point is adjusted, to obtain the texture sampling ratio corresponding to the current second edge line point. Finally, the ratio alignment of other left and right edge line points in the area is realized.

In a specific embodiment, the method for presenting roading conditions and the road condition processing method of this application are applicable in a navigation scenario for lane level maps.

In the map navigation, a route calculation service of the server returns a navigation route from a starting location to a destination to the client, where the navigation route is a trajectory line formed of a series of spatial geometric coordinate points. The expression of navigation route in the existing ordinary map is to generate a regular surface expression with a certain width according to the trajectory, and then the client adds, according to the congested road condition information provided by the road condition service of the server, texture information representing different road conditions to the regular surface, to realize the expression of road condition information. However, for lane-level maps, because the road calculation service returns a more refined and irregular navigation route, a new road condition implementation for irregular navigation routes is needed, and a smooth transition effect between road conditions is needed. According to the method for presenting roading conditions and the road condition processing method of this application, the smooth alignment of road condition effects is realized by the area division and ratio alignment of irregular road condition surfaces, and the natural transition of different road condition effects is realized through accurate texture sampling, so that the problem of over-filling of irregular surfaces and different road conditions can be well solved. The solution is universal and efficient, and can be applied quickly.

The method for presenting roading conditions and road condition processing method of this application include the following.

Figure 13A:
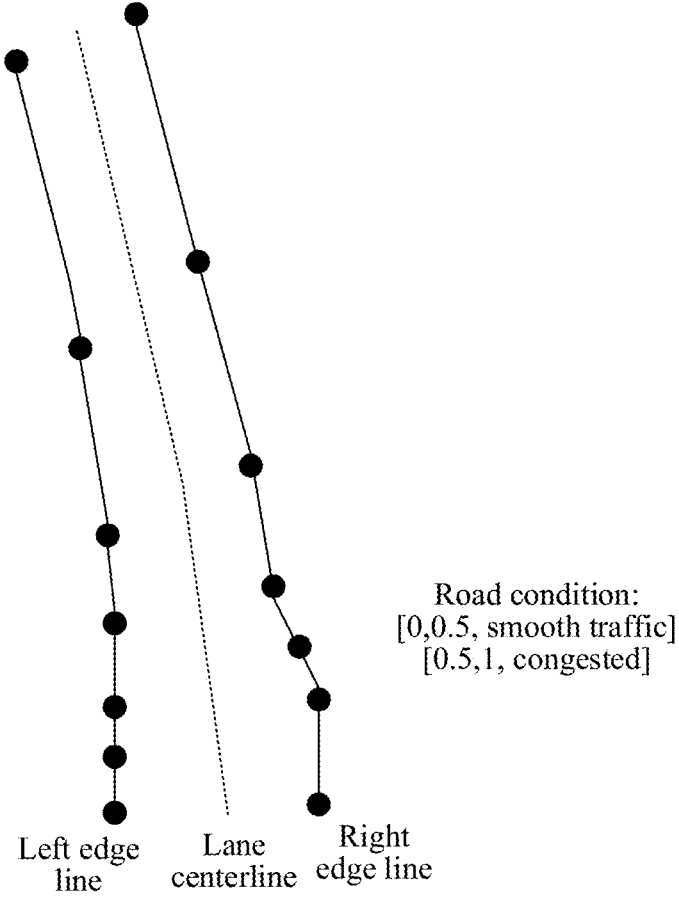
FIG. 13A is a schematic diagram of a road condition surface in an embodiment.

For a road condition surface, as shown in FIG. 13A, by combining the data provided by the road calculation service and the road condition service, two edge lines of the road condition surface formed by spatial geometric points on the left and right sides and one lane centerline with smooth curvature in the middle of the road condition surface can be obtained. At the same time, the road conditions in different areas are represented by the interval range of the length ratio of the right edge line, for example, the range [0,0.5, smooth traffic] means that the area represented by the right edge line from the starting point to 50% of the whole length is green and smooth.

I. Determination of Ratio Information Corresponding to Each Vertex

Figure 13B:
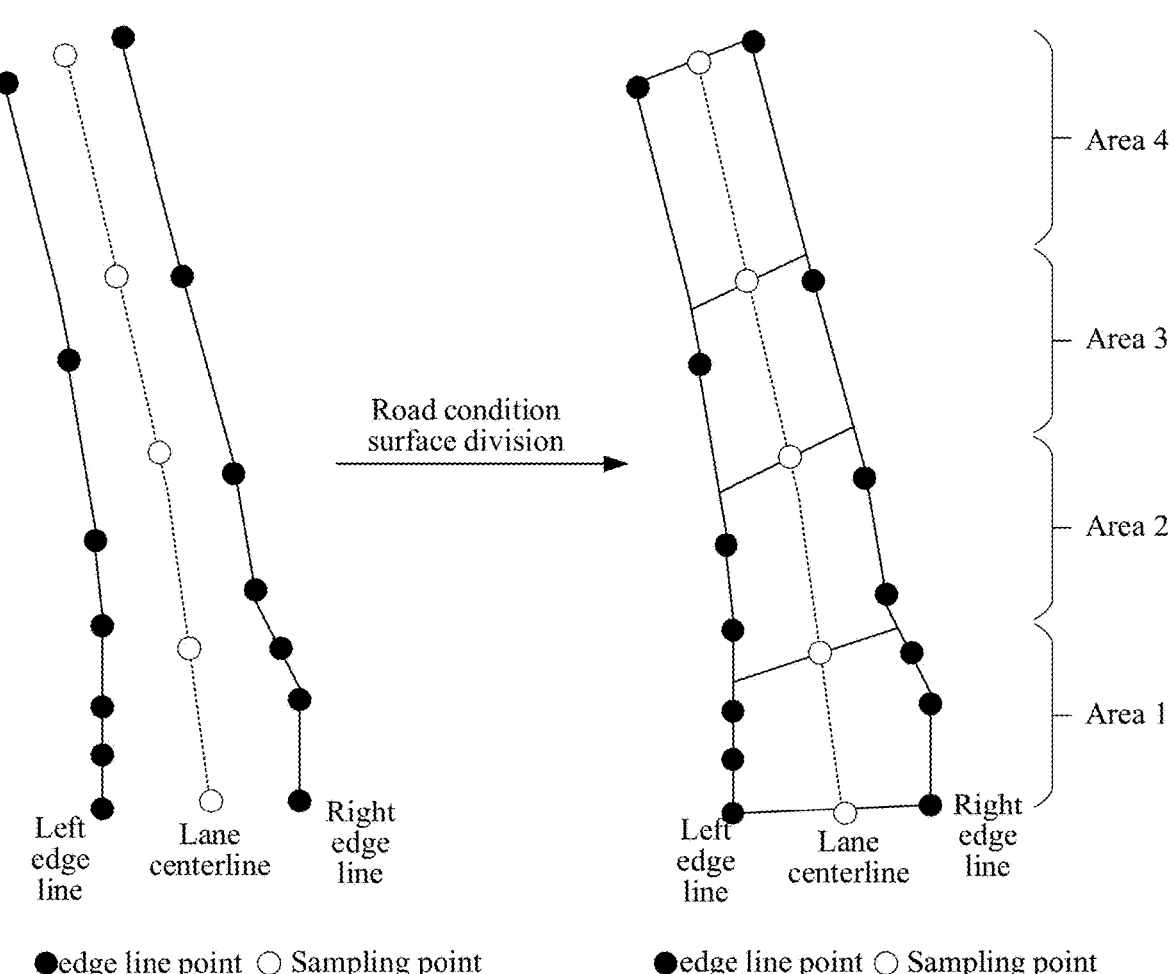
FIG. 13B is a schematic diagram showing division of a road condition surface in an embodiment.

Firstly, the road condition surface is divided. Through simple road condition surface division, the areas formed by different road condition surfaces are ensured to be flat and aligned, and finally the color effects at the left and right sides of whole road condition surface are aligned. As shown in FIG. 13B, equidistant sampling is performed on the centerline of the lane, and intersection points of a straight line passing through the sampling point in a certain direction with the left and right edge lines are obtained. The direction is a direction of a bisector of the angle formed by the sampling point and the forward and backward adjacent points on the centerline. The adjacent sampling points and the intersection points with the left and right edge lines divide the road condition surface into several areas.

Then ratio alignment of the road condition surface is performed. Referring to FIG. 12, for area 1, the cumulative distance ADist of each of points R1, R2, R3, and RS1 from the right edge line starting point is calculated, where ADist(i)=ADist(i−1)+Dist(i, i−1). It is assumed that the total length of the right edge line is RT, and the left and right edge line lengths of area 1 are LT1 and RT1. For the right edge line of area 1, the length ratio of each point on the right edge line of area 1 is respectively: Ratio(i)=ADist(i)/RT. For the left edge line of area 1, the texture sampling ratios corresponding to the starting point L1 and the ending point LS1 of the area are set to Ratio(R1) and Ratio(RS1) respectively. The texture sampling ratio corresponding to other point Li in area 1 is set to Ratio(Li)=(Ratio(L1)+(Ratio(LS1)−Ratio(L1))*k)*LT1/RT1, where k=(ADist(Li)−ADist(L1))/(ADist(LS1)−ADist(L1)), ADist(Li)=ADist(Li−1)+Dist(Li, Li−1). Finally, the ratio alignment of the left and right edge lines of area 1 is completed according to the right edge line. Similarly, the remaining areas can be processed in the same way.

II. Construction of Texture Color Information of Road Condition Surface

Firstly, the texture information of the road condition surface is constructed.

According to the real-time road condition information provided by the road condition service, the road condition texture is dynamically generated according to the following road condition sampling texture. For the sampling textures, from left to right, Sample(0)=no road condition, Sample(0.25)=smooth traffic, Sample(0.5)=slow traffic, Sample(0.75)=congested, Sample(1)=severely congested, Sample(i) represents the road condition information indicated by color obtained from the sampling texture set, i represents the percentage position of sampling texture, and the area between adjacent road condition represents the transition between road conditions. The constructed texture color information of the road condition surface is recorded with an array of 1 row and n columns, where the number n of columns can be selected according to the length of the road condition surface. For the road condition range, road condition 1 includes color information ranging from 0 to column n*a (where 0<=a<=1), and according to the road condition information, the color information in the corresponding array range is Sample(0.25); and road condition 2 includes color information ranging from column n*a to column n, and the color information in the corresponding array range is Sample(0.75). The road condition texture construction method can be applied to any number of road condition information. After all road conditions are processed, the texture information of different road conditions is preliminarily obtained, but there is no smooth gradual transition effect between road conditions.

Then the road condition surface is gradually changed and transitioned. Road condition color needs to be gradually changed between an i+1-th road condition information (b, c, road condition i+1) and an i-th road condition (a, b, road condition i). In the preliminarily constructed road condition information, the color coverage range of road condition i+1 is from n*b to n*c, and the coverage amount $\Delta$(i+1)=n*c−n*b; the color coverage range of road condition i is from n*a to n*b, and the coverage amount $\Delta$(i)=n*b−n*a; and the color dividing position is n*b. A color gradual change radius at the road condition dividing point is set to $$radius = min\left(\frac{min(\Delta(i+1), \Delta i)}{2}, \frac{len(i, i+1)}{2}\right),$$

and the gradual change coverage range is from n*b−radius to n*b+radius. for a location j in the gradual change coverage range, the texture sampling location (that is, Loc(j)) at location j is set to $$\left(Loc(i) + \frac{(Loc(i+1) - Loc(i)) * (j - n*b + radius)}{2*radius}\right).$$ Loc(i)

represents the relative location (in percentage) of road condition i in sampling texture. len(i,i+1)=value*span(i,i+1), where to ensure the maximum range of the road condition gradual change, Span(i, i+1) represents the span between the road condition i and the road condition i+1, and for the sampling texture, the span between adjacent road conditions is 1; and value represents the maximum road condition gradual change range given a span of 1, and the gradual change range of this span of the sampling texture is guaranteed not to exceed.

Texture color information for road condition i and road condition i+1: n*a to n*b−radius in the array correspond to Sample(Loc(i)), n*b+radius to n*c in the array correspond to Sample(Loc(i+1)), column j in n*b−radius to n*b+radius in the array corresponds to Sample(Loc(j)).

III. Area Triangulation and Rendering

Figure 13C:
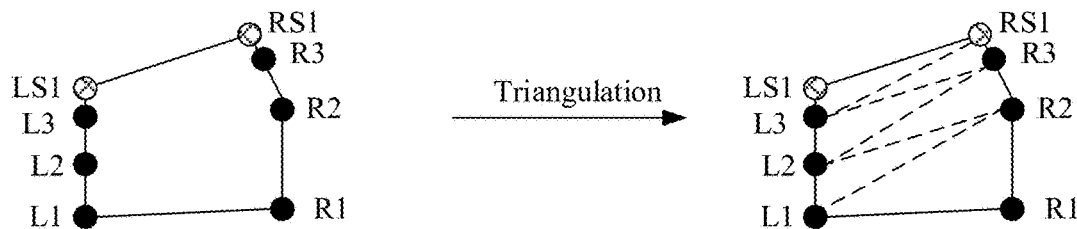
FIG. 13C is a schematic diagram showing triangulation processing in an embodiment.

Each region is triangulated separately. Area 1 is triangulated as shown in FIG. 13C, and other areas are subjected to the same operation. Triangulation is a common processing method in rendering technology. Finally, the triangulated data, the ratio information of each vertex obtained by ratio alignment of the road condition surface and the constructed texture color information are uploaded to the GPU. The color of each vertex is sampled from the texture color information according to the ratio information. The gradual transitioning road surface can be drawn by OpenGL or other rendering technologies.

In the above embodiment, in lane-level maps, the requirement for high-precision positioning and guidance puts forward higher requirements for the traditional road condition guidance, and the guidance surface will have an irregular shape and a good transition effect is needed between road conditions. The lane-level road condition surface generated by the method of this application is fine to the lane and irregular in shape, and has a better guiding effect. the left-to-right presentation effects of the road condition surface are flat and aligned, and there is a smooth gradual change effect between the road conditions, which greatly improves the visual effect of products and makes the presentation of the road condition information more in line with the real road scenarios, thereby improving the accuracy of road condition presentation and improving the accuracy of navigation.

Figure 14:
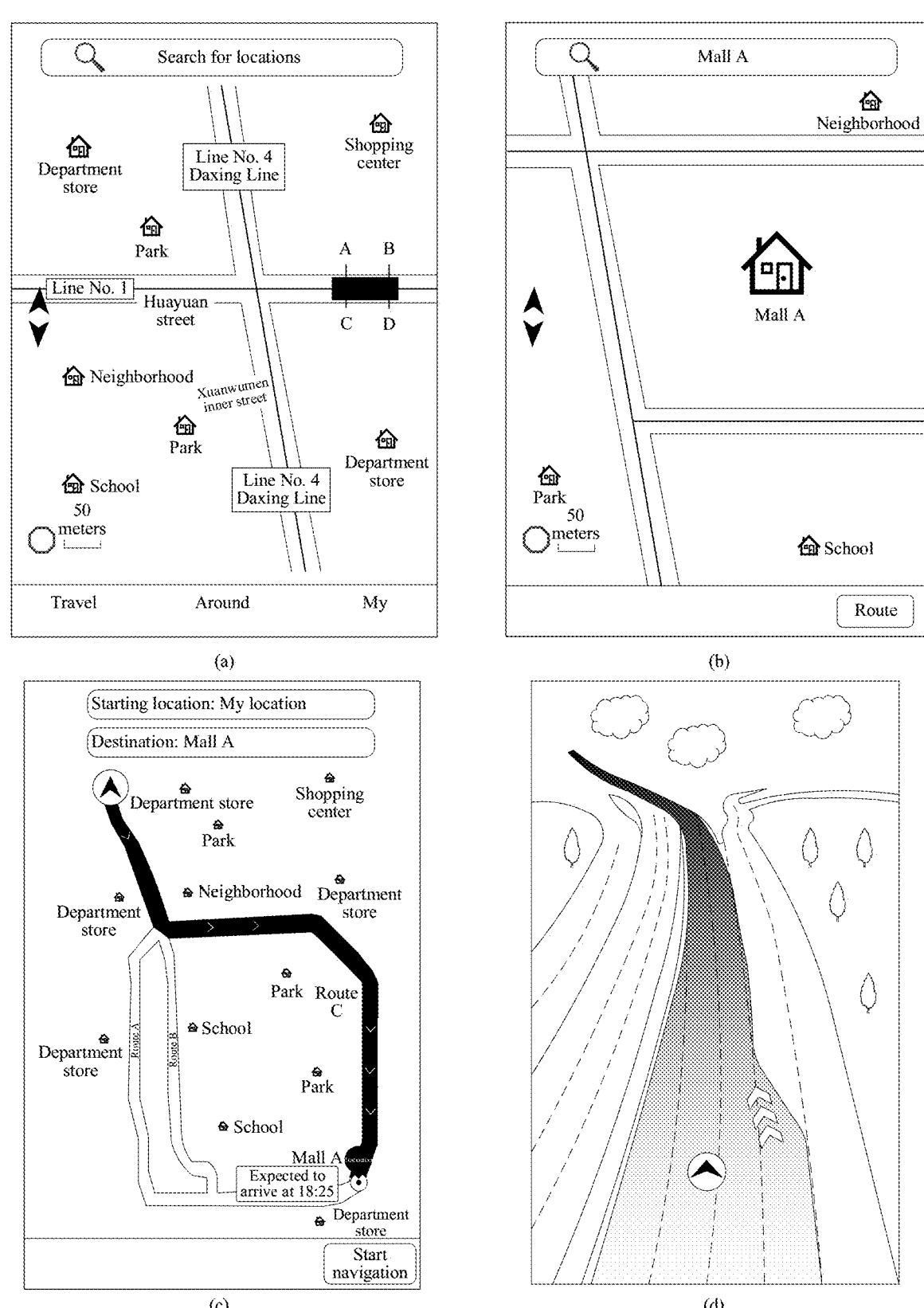
FIG. 14 is a schematic diagram showing travel navigation in an embodiment.

In a specific embodiment, the user can use the navigation application on the terminal for travel navigation. Referring to FIG. 14(a), the user can enter a destination in the search bar to view the geographical location of any place. Referring to FIG. 14(b), after the user enters "Mall A" in the search bar and starts the search, the interface can display the geographical location of Mall A and a "Route" control. The "Route" control is used to start the route planning function. After the user clicks the "Route" control, referring to FIG. 14(c), the navigation route from the starting location (the currently positioned location of the terminal) to the destination (Mall A) and a "Start Navigation" control can be displayed on the interface. After the target navigation route is determined, the user can click the "Start Navigation" control to enter the three-dimensional navigation screen. Referring to FIG. 14(d), a gradual transitioning road surface corresponding to a current road section in the target navigation route that the user will enter is displayed on the three-dimensional navigation screen. When the user moves following the target navigation route, a three-dimensional navigation screen of synchronous movement can be displayed on the interface in real time.

It is to be understood that although the steps in the flowcharts of the embodiments are displayed sequentially according to instructions of arrows, these steps are not necessarily performed sequentially according to a sequence instructed by the arrows. Unless otherwise clearly specified in this specification, the steps are performed without any strict sequence limit, and may be performed in other sequences. In addition, at least some of the steps in the flowchart related to the above-mentioned embodiments may include multiple steps or multiple stages, which may not necessarily be completed at the same time, but may be performed at different times. These steps or stages may not necessarily be performed sequentially, and may be performed alternately with other steps or at least some of other steps or stages.

Based on the same inventive concept, the embodiment of this application further provides a road condition presenting apparatus for implementing the method for presenting roading conditions. The problem solving implementation provided by the apparatus is similar to the implementation recorded in the above method. Therefore, the specific definitions in one or more embodiments of the road condition presenting apparatus provided below can be made reference to the above definitions in the method for presenting roading conditions, and will not be repeated here.

Figure 15:
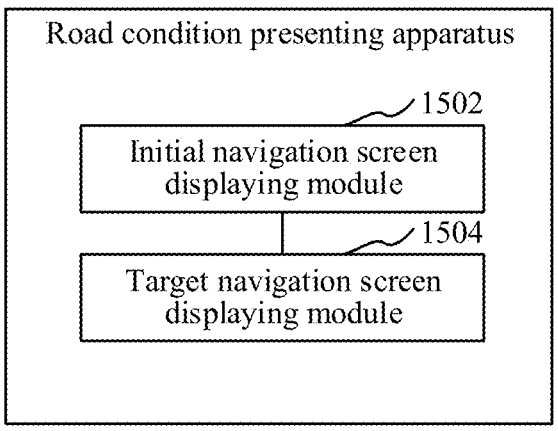
FIG. 15 is a structural block diagram of a road condition presenting apparatus in an embodiment.

In an embodiment, as shown in FIG. 15, a road condition presenting apparatus is provided, which includes: an initial navigation screen displaying module 1502 and a target navigation screen displaying module 1504.

The initial navigation screen displaying module 1502 is configured to present an initial navigation screen and display a target navigation route on the initial navigation screen.

The target navigation screen displaying module 1504 is configured to present a target navigation screen in response to a navigation trigger event for the target navigation route, and display, on the target navigation screen, a gradual transitioning road surface corresponding to a current road section in the target navigation route.

The gradual transitioning road surface is used to indicate a process of the current road section changing from a first road condition to a second road condition. The gradual transitioning road surface includes a first road condition texture corresponding to the first road condition, a second road condition texture corresponding to the second road condition, and a gradual transitioning road texture gradually transitioning from the first road condition texture to the second road condition texture. A road condition transition range corresponding to the gradual transitioning road texture is determined by the road condition textures and road condition coverage ranges corresponding to the first road condition and the second road condition.

In an embodiment, the target navigation route is used to direct a navigation object for travel navigation following the target navigation route, and the initial navigation screen includes a navigation activation control configured to respond to the navigation trigger event.

The target navigation screen displaying module 1504 is further configured to present a target navigation screen in response to a navigation trigger operation for the navigation activation control; and display, on the target navigation screen, a gradual transitioning road surface corresponding to a current road section in the target navigation route that the navigation object will enter. The current road section is a road section determined on the target navigation route based on the currently positioned location of the navigation object. The target navigation screen is a three-dimensional navigation screen determined according to a current perspective of navigation corresponding to the navigation object at the currently positioned location of the navigation object.

In an embodiment, the target navigation screen displaying module 1504 is further configured to sequentially display, on the target navigation screen that changes synchronously with the movement of the navigation object, a gradual transitioning road surface respectively corresponding to each road section that the navigation object will enter sequentially on the target navigation route, in case that the navigation object moves following the target navigation route.

In an embodiment, The target navigation screen displaying module 1504 is further configured to display a reference navigation screen in response to a selection operation on a target road section in various road sections of the target navigation route, and display a gradual transitioning road surface corresponding to the target road section on a reference navigation screen. The reference navigation screen is a three-dimensional navigation screen determined at a road section positioned location where the target road section resides according to a preset perspective of navigation.

In an embodiment, the initial navigation screen displaying module 1502 is further configured to display a global road condition surface corresponding to the target navigation route on the initial navigation screen. The global road condition surface is used to indicate various road conditions involved in the target navigation route, and the global road condition surface includes initial road condition textures respectively corresponding to various road conditions.

In an embodiment, the target navigation screen displaying module 1504 is further configured to refresh the gradual transitioning road surface to display an updated road condition surface in case that the road condition of the current road section changes. The updated road condition surface is used to indicate the updated road conditions of the current road section.

In an embodiment, the target navigation screen displaying module 1504 is further configured to display a first texture color corresponding to the first road condition in a starting area of the current road section; display a transitional texture color gradually changing from the first texture color to a second texture color between the starting area and an ending area of the current road section, where the transitional texture color includes a dynamic number of gradually changing texture colors, and the number of the gradually changing texture colors is determined based on the road condition transition range; and display the second texture color corresponding to the second road condition in the ending area of the current road section.

In the road condition presenting apparatus, the first road condition texture and the second road condition texture are used to distinguish different road conditions. The gradual transitioning road texture is used to reflect the changing process between different road conditions. The road condition coverage ranges, and the road condition transition range can determine the coverage ranges of the road condition textures of different road conditions and the gradual transitioning road texture. Therefore, the generated gradual transitioning road surface can more finely present the road condition information, and realize a smooth gradual change effect between different road conditions. Accordingly, the presentation of the road condition information is more in line with the real road scenarios, thus improving the accuracy of road condition presentation and improving the accuracy of navigation.

Figure 16:
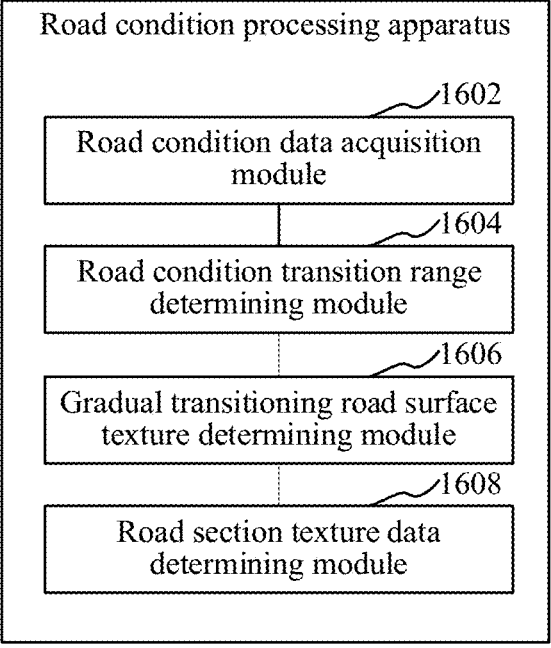
FIG. 16 is a structural block diagram of a road condition processing apparatus in an embodiment.

In an embodiment, as shown in FIG. 16, a road condition processing apparatus is provided, which includes: a road condition data acquisition module 1602, a road condition transition range determining module 1604, a gradual transitioning road texture determining module 1506 and a road section texture data determining module 1608.

The road condition data acquisition module 1602 is configured to acquire initial road condition textures and road condition coverage ranges respectively corresponding to a first road condition and a second road condition involved in a current road section.

The road condition transition range determining module 1604 is configured to determine a road condition transition range between the first road condition and the second road condition based on the initial road condition textures and the road condition coverage ranges respectively corresponding to the first road condition and the second road condition.

The gradual transitioning road texture determining module 1606 is configured to adjust the road condition texture over gradual changes from the initial road condition texture corresponding to the first road condition to the initial road condition texture corresponding to the second road condition, and to obtain a gradual transitioning road texture corresponding to the road condition transition range.

The road section texture data determining module 1608 is configured to obtain road section texture data corresponding to the current road section based on the initial road condition textures and corresponding road condition coverage ranges, and the gradual transitioning road texture and corresponding road condition transition range. The road section texture data is used to generate the gradual transitioning road surface corresponding to the current road section. The gradual transitioning road surface is used to indicate the process of the current road section changing from a first road condition to a second road condition.

In an embodiment, the road condition transition range determining module 1604 is further configured to determine a target coverage range from the road condition coverage ranges respectively corresponding to the first road condition and the second road condition; determine a road condition span based on the difference between the initial road condition textures corresponding to the first road condition and the second road condition; obtain a road condition texture gradual change radius based on a reference road condition gradual change range corresponding to the road condition span and the target coverage range; and obtain the road condition transition range based on a dividing location between the first road condition and the second road condition and the road condition texture gradual change radius.

In an embodiment, the gradual transitioning road texture determining module 1606 is further configured to take various location points included in the road condition transition range respectively as a target location point; determine a road condition texture variation of the target location point relative to a starting location point of the road condition transition range based on a distance between the target location point and the starting location point, and obtain a target road condition texture corresponding to the target location point based on an initial road condition texture corresponding to the starting location point and the road condition texture variation of the target location point relative to the starting location point; and obtain the gradual transitioning road texture corresponding to the road condition transition range based on the target road condition textures respectively corresponding to various location points.

In an embodiment, the road condition processing apparatuses further includes a texture sampling ratio determining module, configured to acquire edge line point locations of various road edge line points corresponding to the current road section, and determine texture sampling ratios corresponding to the road edge line points based on the edge line point locations of the road edge line points; a target road condition texture determining module, configured to perform texture sampling in the road section texture data based on the texture sampling ratios corresponding to the road edge line points, to obtain the target road condition textures respectively corresponding to the various road edge line points; and a gradual transitioning road surface generating module, configured to generate a gradual transitioning road surface based on the target road condition textures and the edge line point locations corresponding to the various road edge line points.

In an embodiment, the texture sampling ratio determining module is further configured to divide a left road edge line and a right road edge line of the current road section into a first-type edge line and a second-type edge line; calculate length ratios of various cumulative distances on the first-type edge line based on the cumulative distances of various road edge line points on the first-type edge line from the starting point of the road edge line, to obtain the texture sampling ratios respectively corresponding to various road edge line points on the first-type edge line; and perform ratio alignment on the road edge line points on the second-type edge line based on the texture sampling ratios and the edge line point locations corresponding to the road edge line points on the first-type edge line, and the edge line point locations corresponding to the left road edge line points on the second-type edge line, to obtain the texture sampling ratios respectively corresponding to various road edge line points on the second-type edge line.

In an embodiment, the texture sampling ratio determining module is further configured to acquire a road centerline corresponding to the current road section; divide the current road section based on the road centerline, to obtain at least two areas; perform ratio alignment on the road edge line points belonging to the second-type edge line in the area based on the texture sampling ratios and edge line point locations corresponding to the road edge line points belonging to the first-type edge line and the edge line point locations corresponding to road edge line points belonging to the second-type edge line in the same area, to obtain the texture sampling ratios respectively corresponding to various road edge line points on the second-type edge line.

In an embodiment, the texture sampling ratio determining module is further configured to sample the road centerline, to obtain multiple central sampling points; determine the direction of a dividing line based on the central sampling point and a corresponding adjacent sampling point, to obtain the direction of the dividing line respectively corresponding to each central sampling point; generate an area dividing line passing through the central sampling point in the direction of the dividing line, to obtain an area dividing line respectively corresponding to each central sampling point; and divide the current road section based on various area dividing lines, to obtain at least two areas.

In an embodiment, the texture sampling ratio determining module is further configured to perform equidistant sampling on the road centerline, to obtain multiple central sampling points. The texture sampling ratio determining module is further configured to perform dynamic sampling on the road centerline according to the curvature of the road centerline, to obtain multiple central sampling points.

In an embodiment, the texture sampling ratio determining module is further configured to take a road edge line starting point and a road edge line ending point belonging to the first-type edge line in a current area as a current first edge line starting point and a current first edge line ending point, and take a road edge line starting point and a road edge line ending point belonging to the second-type edge line in the current area as a current second edge line starting point and a current second edge line ending point; take the texture sampling ratio corresponding to the current first edge line starting point as the texture sampling ratio corresponding to the current second edge line starting point, and take the texture sampling ratio corresponding to the current first edge line ending point as the texture sampling ratio corresponding to the current second edge line ending point; calculate a distance ratio corresponding to a current second edge line point belonging to the second-type edge line based on cumulative distances of the current second edge line point respectively from the current second edge line starting point and the current second edge line ending point in the current area; obtain an initial sampling ratio corresponding to the current second edge line point based on the texture sampling ratios respectively corresponding to the current second edge line starting point and the current second edge line ending point and the distance ratio corresponding to the current second edge line point; adjust the initial sampling ratio corresponding to the current second edge line point based on the first-type edge line length and the second-type edge line length corresponding to the current area, to obtain the texture sampling ratio corresponding to the current second edge line point.

In the road condition processing apparatus, the road section texture data obtained based on the initial road condition textures, the gradual transitioning road texture, the road condition coverage ranges and the road condition transition range can be used to generate the gradual transitioning road surface. The initial road condition textures are used to distinguish different road conditions. The gradual transitioning road texture is used to reflect the changing process between different road conditions. The road condition coverage ranges, and the road condition transition range can determine the coverage ranges of the initial road condition textures and the gradual transitioning road texture. Therefore, the generated gradual transitioning road surface can more finely present the road condition information, and realize a smooth gradual change effect between different road conditions. Accordingly, the presentation of the road condition information is more in line with the real road scenarios, thus improving the accuracy of road condition presentation and improving the accuracy of navigation.

All or some of the modules in the road condition presenting apparatus and the road condition processing apparatus can be implemented by software, hardware, and a combination thereof. The above modules can be built as hardware in or independent of a processor in a computer device, or can be stored as software in a memory of the computer device, so that the processor can invoke and execute the operations corresponding to the above modules.

Figure 17:
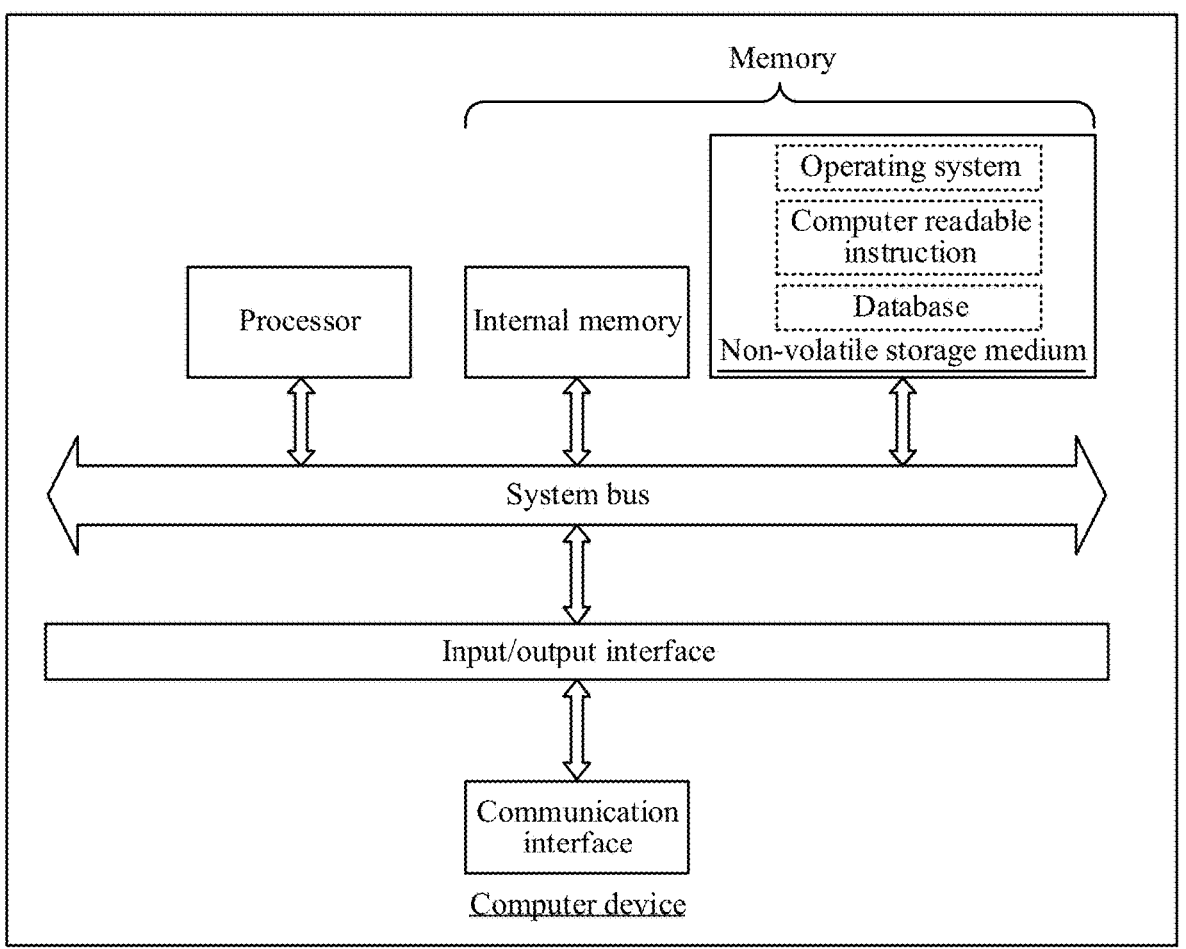
FIG. 17 is a diagram showing the internal structure of a computer device in an embodiment.

In an embodiment, a computer device is provided, which can be a server and has an internal structure as shown in FIG. 17. The computer device includes a processor, a memory, an input/output (I/O) interface, and a communication interface. The processor, the memory and the input/output interface are connected through a system bus, and the communication interface is connected to the system bus via the input/output interface. The processor of the computer device is used to provide calculation and control abilities. The memory of the computer device includes a non-volatile storage medium and an internal memory. An operating system, a computer readable instruction and a database are stored in the non-volatile storage medium. The internal memory provides an environment for the operation of the operating system and the computer readable instruction in the non-volatile storage medium. The database of the computer device is configured to store the road condition texture, the perspective of navigation and other data. The input/output interface of the computer device is configured to exchange information between the processor and external devices. The communication interface of the computer device is configured to communicate with an external terminal through network connection. The computer readable instruction is executed by a processor to implement the road condition processing method.

Figure 18:
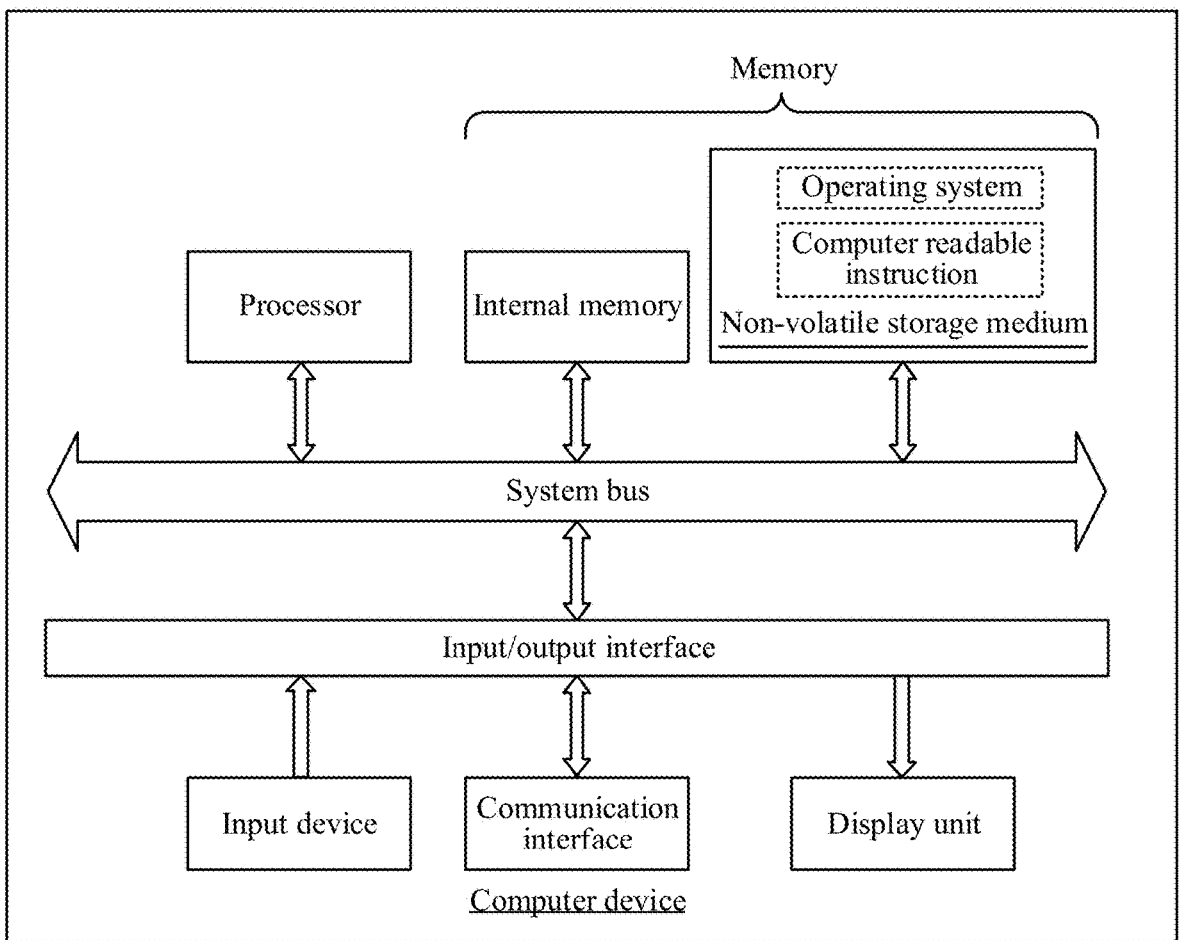
FIG. 18 is a diagram showing the internal structure of a computer device in another embodiment.

In an embodiment, a computer device is provided. The computer device may be a terminal and has an internal structure as shown in FIG. 18. The computer device includes a processor, a memory, an input/output interface, a communication interface, a display unit and an input device. The processor, the memory and the input/output interface are connected through a system bus, and the communication interface, the display unit and the input device are connected to the system bus via the input/output interface. The processor of the computer device is used to provide calculation and control abilities. The memory of the computer device includes a non-volatile storage medium and an internal memory. An operating system and a computer readable instruction are stored in the non-volatile storage medium. The internal memory provides an environment for the operation of the operating system and the computer readable instruction in the non-volatile storage medium. The input/output interface of the computer device is configured to exchange information between the processor and external devices. The communication interface of the computer device is configured to communicate with an external terminal through wired or wireless connection. Wireless connection can be achieved through WIFI, mobile cellular network, near field communication (NFC) or other technologies. The computer readable instruction is executed by a processor to implement the method for presenting roading conditions and the road condition processing method. The display unit of the computer device is configured to create a visually visible screen, and may be a display screen, a projection device or a virtual reality imaging device. The display screen may be a liquid crystal display screen or an e-ink display screen. The input device of the computer device may be a touch layer covering the display screen, a button, a trackball, or a touchpad provided on a housing of the computer device, or an externally connected keyboard, touchpad, mouse or the like.

A person skilled in the art can understand that the structures shown in FIGS. 17 and 18 are merely a block diagram of a partial structure related to a solution in this application, and do not constitute a limitation to the computer device to which the solution in this application is applied. Specifically, the computer device may include more or fewer components than those shown in the figure, or have some components combined, or have a different component deployment.

In an embodiment, a computer device is further provided, which includes a memory and one or multiple processors. The memory stores a computer-readable instructions. In case that the computer readable instruction is executed by the one or multiple processors, steps of the method embodiments are implemented.

In an embodiment, a computer-readable storage medium is provided, which stores a computer readable instruction. In case that the computer readable instruction is executed by one or multiple processors, steps of the method embodiments are implemented.

In an embodiment, a computer program product or a computer program is provided, which includes a computer readable instruction, stored in a computer readable storage medium. One or multiple processors of the computer device read the computer readable instruction from the computer readable storage medium, and the computer readable instruction is executed by the one or multiple processors, to implement steps of the method embodiments on the computer device.

It is to be understood that the user information (including, but not limited to, the user equipment information, and the user personal information, etc.) and data (including, but not limited to, data for analysis, stored data, and presented data, etc.) involved in this application are all information and data authorized by the users or fully authorized by all parties. The collection, use and processing of relevant data is needed to comply with relevant laws, regulations and standards of relevant countries and regions.

Those of ordinary skill in the art can understand that all or part of the processes implementing the above-described methods in the embodiments can be implemented by a computer readable instruction instructing relevant hardware. The computer readable instruction may be stored in a non-volatile computer readable storage medium. In case that the computer readable instruction is executed, the processes of the methods in above-mentioned embodiments are implemented. Any reference to the memory, database or other media used in the embodiments provided in the present disclosure includes at least one of a non-volatile or a volatile memory. The non-volatile memory may include a read only memory (ROM), a magnetic tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), and a graphene memory, etc. The volatile memory may include random access memory (RAM) or external cache memory. For the purpose of illustration but not limitation, RAM is available in many forms, for example, static random access memory (SRAM) or dynamic random access memory (DRAM), and so on.

The databases involved in various embodiments provided in this application may include at least one of relational databases and non-relational databases. Non-relational databases may include, but are not limited to, distributed databases based on blockchain. The processors involved in the embodiments provided in this application can be, without limitation, general-purpose processors, central processing units, graphics processing units, digital signal processors, programmable logics, and data processing logics based on quantum computing, etc.

The technical features in the above-described embodiments can be combined at will, and for the brevity of description, not all possible combinations of the technical features in the above-mentioned embodiments are described. However, the combinations of these technical features should be considered to fall within the scope of the present application as long as there are no contradictions.

The above embodiments are only several implementations of the present application, and are described in detail, which, however, are not to be construed as a limitation to the scope of the present disclosure. It is to be understood that for a person of ordinary skill in the art, several variations and improvements can be made without departing from the idea of the present disclosure, which are all contemplated in the protection scope of the present disclosure. Therefore, the protection scope of this application shall be defined by the appended claims.

What is claimed is:

1. A method for presenting roading conditions, implemented by a computer device that comprises at least one processor, the method comprising:

presenting an initial navigation screen, and displaying a target navigation route on the initial navigation screen; and presenting a target navigation screen in response to a navigation trigger event for the target navigation route, and displaying, on the target navigation screen, a gradual transitioning road surface corresponding to a current road section in the target navigation route, the gradual transitioning road surface indicating the current road section changing from a first road condition to a second road condition, the gradual transitioning road surface comprising a first road condition texture corresponding to the first road condition, a second road condition texture corresponding to the second road condition, and a gradual transitioning road texture gradually transitioning from the first road condition texture to the second road condition texture, and a road condition transition range corresponding to the gradual transitioning road texture determined by the road condition textures and road condition coverage ranges corresponding to the first road condition and the second road condition.

2. The method according to claim 1, wherein the target navigation route is used to direct navigation following the target navigation route, and the initial navigation screen comprises a navigation activation control configured to respond to the navigation trigger event; and the presenting a target navigation screen in response to a navigation trigger event for the target navigation route and displaying, on the target navigation screen, a gradual transitioning road surface corresponding to a current road section in the target navigation route comprises:

presenting a target navigation screen in response to a trigger operation for the navigation activation control, and displaying, on the target navigation screen, a gradual transitioning road surface corresponding to a current road section, the current road section being determined based on a currently positioned location of a navigation object, and the target navigation screen being a three-dimensional navigation screen determined according to a current perspective of navigation corresponding to the navigation object.

3. The method according to claim 2, further comprising:

sequentially displaying, on the target navigation screen that changes synchronously with the movement of the navigation object, a gradual transitioning road surface respectively corresponding to each road section that the navigation object enters sequentially on the target navigation route, in case that the navigation object follows the target navigation route.

4. The method according to claim 1, further comprising:

presenting a reference navigation screen in response to a selection operation on a target road section in various road sections of the target navigation route, and displaying a gradual transitioning road surface corresponding to the target road section on the reference navigation screen, the reference navigation screen being a three-dimensional navigation screen determined at a road section positioned location where the target road section resides according to a preset perspective of navigation.

5. The method according to claim 1, further comprising:

displaying a global road condition surface corresponding to the target navigation route on the initial navigation screen, the global road condition surface being used to indicate various road conditions involved in the target navigation route, and the global road condition surface comprising initial road condition textures respectively corresponding to the various road conditions.

6. The method according to claim 1, further comprising:

refreshing the gradual transitioning road surface to display an updated road condition surface in case that the road condition of the current road section changes, the updated road condition surface indicating the updated road conditions of the current road section.

7. The method according to claim 1, wherein the displaying, on the target navigation screen, a gradual transitioning road surface corresponding to a current road section in the target navigation route comprises:

displaying a first texture color corresponding to the first road condition in a starting area of the current road section;

displaying a transitional texture color gradually changing from the first texture color to a second texture color between the starting area and an ending area of the current road section, the transitional texture color comprising a dynamic number of gradually changing texture colors, and the number of the gradually changing texture colors being determined based on the road condition transition range; and displaying the second texture color corresponding to the second road condition in the ending area of the current road section.

8. A road condition processing method, implemented by a computer device, the method comprising:

acquiring initial road condition textures and road condition coverage ranges respectively corresponding to a first road condition and a second road condition involved in a current road section;

determining a road condition transition range between the first road condition and the second road condition based on the initial road condition textures and the road condition coverage ranges respectively corresponding to the first road condition and the second road condition;

adjusting a road condition texture over gradual changes from the initial road condition texture corresponding to the first road condition to the initial road condition texture corresponding to the second road condition, to obtain a gradual transitioning road texture corresponding to the road condition transition range; and obtaining road section texture data corresponding to the current road section based on the initial road condition textures and corresponding road condition coverage ranges, and the gradual transitioning road texture and corresponding road condition transition range, the road section texture data corresponding to a gradual transitioning road surface of the current road section, and the gradual transitioning road surface indicating a process of the current road section transitioning from the first road condition to the second road condition.

9. The method according to claim 8, wherein the determining a road condition transition range between the first road condition and the second road condition based on the initial road condition textures and the road condition coverage ranges respectively corresponding to the first road condition and the second road condition comprises:

determining a target coverage range from the road condition coverage ranges respectively corresponding to the first road condition and the second road condition;

determining a road condition span based on the difference between the initial road condition textures corresponding to the first road condition and the second road condition;

obtaining a road condition texture gradual change radius based on a reference road condition gradual change range corresponding to the road condition span and the target coverage range; and obtaining the road condition transition range based on a dividing location between the first road condition and the second road condition and the road condition texture gradual change radius.

10. The method according to claim 8, wherein the adjusting the road condition texture over gradual changes from the initial road condition texture corresponding to the first road condition to the initial road condition texture corresponding to the second road condition to obtain a gradual transitioning road texture corresponding to the road condition transition range comprises:

taking various location points comprised in the road condition transition range respectively as a target location point;

determining a road condition texture variation of the target location point relative to a starting location point of the road condition transition range based on the distance between the target location point and the starting location point, obtaining a target road condition texture corresponding to the target location point based on an initial road condition texture corresponding to the starting location point and the road condition texture variation of the target location point relative to the starting location point; and obtaining the gradual transitioning road texture corresponding to the road condition transition range based on the target road condition textures respectively corresponding to various location points.

11. The method according to claim 8, further comprising: acquiring edge line point locations of various road edge line points corresponding to the current road section, and determining texture sampling ratios corresponding to the road edge line points based on the edge line point locations of the road edge line points;

performing texture sampling in the road section texture data based on the texture sampling ratios corresponding to the road edge line points, to obtain the target road condition textures respectively corresponding to the various road edge line points; and generating the gradual transitioning road surface based on the target road condition textures and the edge line point locations corresponding to the various road edge line points.

12. The method according to claim 11, wherein the determining texture sampling ratios corresponding to the road edge line points based on the edge line point locations of the road sideline points comprises dividing a left road edge line and a right road edge line of the current road section into a first-type edge line and a second-type edge line;

calculating length ratios of various cumulative distances on the first-type edge line based on the cumulative distances of various road edge line points on the first-type edge line from a starting point of the road edge line, to obtain the texture sampling ratios respectively corresponding to various road edge line points on the first-type edge line; and performing ratio alignment on the road edge line points on the second-type edge line, to obtain the texture sampling ratios respectively corresponding to various road edge line points on the second-type edge line based on the texture sampling ratios and the edge line point locations corresponding to the road edge line points on the first-type edge line, and the edge line point locations corresponding to the road edge line points on the second-type edge line.

13. The method according to claim 12, wherein the performing ratio alignment on the road edge line points on the second-type edge line based on the texture sampling ratios and the edge line point locations corresponding to the road edge line points on the first-type edge line and the edge line point locations corresponding to the road edge line points on the second-type edge line to obtain the texture sampling ratios respectively corresponding to various road edge line points on the second-type edge line comprises:

acquiring a road centerline corresponding to the current road section;

dividing the current road section based on the road centerline to obtain at least two areas; and performing ratio alignment on the road edge line points belonging to the second-type edge line in the area based on the texture sampling ratios and edge line point locations corresponding to the road edge line points belonging to the first-type edge line and the edge line point locations corresponding to road edge line points belonging to the second-type edge line in the same area, to obtain the texture sampling ratios respectively corresponding to various road edge line points on the second-type edge line.

14. The method according to claim 13, wherein the dividing the current road section based on the road centerline to obtain at least two areas comprises:

sampling the road centerline, to obtain multiple central sampling points;

determining the direction of a dividing line based on the central sampling point and a corresponding adjacent sampling point, to obtain the direction of the dividing line respectively corresponding to each central sampling point;

generating an area dividing line passing through the central sampling point in the direction of the dividing line, to obtain an area dividing line respectively corresponding to each central sampling point; and dividing the current road section based on each area dividing line, to obtain the at least two areas.

15. The method according to claim 14, wherein the central sampling points are determined by any one of performing equidistant sampling on the road centerline, to obtain multiple central sampling points; or performing dynamic sampling on the road centerline according to the curvature of the road centerline, to obtain multiple central sampling points.

16. The method according to claim 13, wherein the performing ratio alignment on the road edge line points belonging to the second-type edge line in the area based on the texture sampling ratios and edge line point locations corresponding to the road edge line points belonging to the first-type edge line and the edge line point locations corresponding to road edge line points belonging to the second-type edge line in the same area to obtain the texture sampling ratios respectively corresponding to various road edge line points on the second-type edge line comprises:

taking a road edge line starting point and a road edge line ending point belonging to the first-type edge line in a current area as a current first edge line starting point and a current first edge line ending point, and taking a road edge line starting point and a road edge line ending point belonging to the second-type edge line in the current area as a current second edge line starting point and a current second edge line ending point;

taking the texture sampling ratio corresponding to the current first edge line starting point as the texture sampling ratio corresponding to the current second edge line starting point, and taking the texture sampling ratio corresponding to the current first edge line ending point as the texture sampling ratio corresponding to the current second edge line ending point;

calculating a distance ratio corresponding to the current second edge line point based on cumulative distances of a current second edge line point belonging to the second-type edge line respectively from the current second edge line starting point and the current second edge line ending point in the current area;

obtaining an initial sampling ratio corresponding to the current second edge line point based on the texture sampling ratios respectively corresponding to the current second edge line starting point and the current second edge line ending point and the distance ratio corresponding to the current second edge line point; and adjusting the initial sampling ratio corresponding to the current second edge line point based on the first-type edge line length and the second-type edge line length corresponding to the current area, to obtain a texture sampling ratio corresponding to the current second edge line point.

17. A computer device, comprising a memory and one or multiple processors, the memory storing a computer readable instruction, wherein the computer readable instruction is executed by the one or multiple processors, and the one or multiple processors are configured to perform:

presenting an initial navigation screen, and displaying a target navigation route on the initial navigation screen; and presenting a target navigation screen in response to a navigation trigger event for the target navigation route, and displaying, on the target navigation screen, a gradual transitioning road surface corresponding to a current road section in the target navigation route, the gradual transitioning road surface indicating the current road section changing from a first road condition to a second road condition, the gradual transitioning road surface comprising a first road condition texture corresponding to the first road condition, a second road condition texture corresponding to the second road condition, and a gradual transitioning road texture gradually transitioning from the first road condition texture to the second road condition texture, and a road condition transition range corresponding to the gradual transitioning road texture determined by the road condition textures and road condition coverage ranges corresponding to the first road condition and the second road condition.

18. The computer device according to claim 17, wherein the target navigation route is used to direct navigation following the target navigation route, and the initial navigation screen comprises a navigation activation control configured to respond to the navigation trigger event; and the presenting a target navigation screen in response to a navigation trigger event for the target navigation route and displaying, on the target navigation screen, a gradual transitioning road surface corresponding to a current road section in the target navigation route comprises:

presenting a target navigation screen in response to a trigger operation for the navigation activation control, and displaying, on the target navigation screen, a gradual transitioning road surface corresponding to a current road section, the current road section being determined based on a currently positioned location of a navigation object, and the target navigation screen being a three-dimensional navigation screen determined according to a current perspective of navigation corresponding to the navigation object.

19. The computer device according to claim 18, wherein the one or multiple processors are configured to perform:

sequentially displaying, on the target navigation screen that changes synchronously with the movement of the navigation object, a gradual transitioning road surface respectively corresponding to each road section that the navigation object enters sequentially on the target navigation route, in case that the navigation object follows the target navigation route.

20. The computer device according to claim 17, wherein the one or multiple processors are configured to perform:

presenting a reference navigation screen in response to a selection operation on a target road section in various road sections of the target navigation route, and displaying a gradual transitioning road surface corresponding to the target road section on the reference navigation screen, the reference navigation screen being a three-dimensional navigation screen determined at a road section positioned location where the target road section resides according to a preset perspective of navigation.

* * * * *